US011995275B2

(12) United States Patent
Nakanishi

(10) Patent No.: US 11,995,275 B2
(45) Date of Patent: May 28, 2024

(54) DETECTION DEVICE, DISPLAY DEVICE, AND DISPLAY DEVICE WITH A SENSOR FUNCTION

(71) Applicant: Japan Display Inc., Tokyo (JP)

(72) Inventor: Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/074,891

(22) Filed: Dec. 5, 2022

(65) Prior Publication Data

US 2023/0176696 A1 Jun. 8, 2023

(30) Foreign Application Priority Data

Dec. 7, 2021 (JP) ................................. 2021-198897

(51) Int. Cl.
*G06F 3/044* (2006.01)
*G01D 5/24* (2006.01)
*G06F 3/041* (2006.01)

(52) U.S. Cl.
CPC ............... *G06F 3/044* (2013.01); *G01D 5/24* (2013.01); *G06F 3/04184* (2019.05); *G06F 2203/04107* (2013.01)

(58) Field of Classification Search
CPC .................. G06F 3/044; G06F 3/04184; G06F 2203/04107; G06F 2203/04103; G06F 2203/04112; G06F 3/041; G06F 3/0412; G06F 3/04164; G06F 3/0443; G06F 3/0445; G06F 3/0446; G01D 5/24
See application file for complete search history.

(56) References Cited

U.S. PATENT DOCUMENTS

| | | | |
|---|---|---|---|
| 2012/0249458 A1 | 10/2012 | Okazaki et al. | |
| 2013/0033452 A1* | 2/2013 | Fukushima | G02F 1/13338 345/174 |
| 2013/0328807 A1* | 12/2013 | Matsumoto | G06F 3/0416 345/173 |
| 2017/0192560 A1* | 7/2017 | Ham | G06F 3/016 |
| 2018/0166507 A1* | 6/2018 | Hwang | G06F 3/04166 |
| 2019/0129530 A1* | 5/2019 | Shen | H04N 23/51 |
| 2019/0302959 A1* | 10/2019 | Clark | G06F 3/0412 |
| 2020/0201482 A1* | 6/2020 | Weisse | G06F 3/0443 |

FOREIGN PATENT DOCUMENTS

JP 2012-212335 A 11/2012

* cited by examiner

*Primary Examiner* — Hong Zhou
(74) *Attorney, Agent, or Firm* — K&L Gates LLP

(57) ABSTRACT

A detection device includes: a substrate, a detection electrode on a first surface of the substrate, a first flexible printed circuit board electrically connected to the detection electrode, a shield layer on a second surface opposite the first surface of the substrate, and a second flexible printed circuit board electrically connected to the shield layer on the second surface; wherein the first flexible printed circuit board has a first terminal on a side of a first side extending outward from the substrate, the second flexible printed circuit board has a second terminal on a side of a second side extending outward from the substrate, the first flexible printed circuit board and the second flexible printed circuit board are arranged side-by-side along a side of the substrate.

11 Claims, 18 Drawing Sheets

DETECTION DEVICE, DISPLAY DEVICE, AND DISPLAY DEVICE WITH A SENSOR FUNCTION

CROSS REFERENCE TO RELATED APPLICATIONS

This application claims the benefit of priority from the prior to Japanese Patent Application No. 2021-198897 filed on Dec. 7, 2021, the entire contents of which are incorporated herein by reference.

FIELD

An embodiment of the present invention relates to a detection device, a display device, and a display device with a sensor function.

BACKGROUND

A liquid crystal display device on which a touch detection device is mounted is known as one type of touch panel (refer to Japanese laid-open patent publication No. 2012-212335).

SUMMARY

An embodiment of the present invention is a detection device. The detection device includes a substrate, a detection electrode on a first surface of the substrate, a first flexible printed circuit board electrically connected to the detection electrode, a shield layer on a second surface opposite the first surface of the substrate, and at least one of a second flexible printed circuit board electrically connected to the shield layer on the second surface, wherein the first flexible printed circuit board has a first terminal on a side of a first side extending outward from the substrate, the second flexible printed circuit board has a second terminal on a side of a second side extending outward from the substrate, the first flexible printed circuit board and the second flexible printed circuit board are arranged side-by-side along a side of the substrate so that at least a portion of the first terminal and the second terminal overlap in a plan view, and the first and second terminals are electrically connected.

An embodiment of the present invention is a display device. The display device includes a display panel, a detection device on the display panel, and an adhesive layer located between the display panel and the detection device, wherein the detection device has a shield layer, the detection device is electrically connected to a first flexible printed circuit board, the shield layer is electrically connected to a second flexible printed circuit board, and the first flexible printed circuit board and the second flexible printed circuit board are electrically connected.

An embodiment of the present invention is a display device with a sensor function. The display device includes a display panel, a display control circuit for controlling the display panel, a detection device, a sensor substrate included in the detection device, and a sensor control circuit for controlling the detection device, wherein the detection device has a detection electrode and a shield layer, the detection device is arranged facing a display surface of the display panel, the shield layer is arranged between the display surface and the detection electrode, the display control circuit and the sensor control circuit are electrically connected to each other and driven synchronously, the display control circuit and the sensor control circuit maintain the detection electrode and the shield layer at a constant potential during a display writing period in which the display panel performs display, the display panel stops writing the display during a detection period in which a detection signal is supplied to the detection electrode, and the shield layer is supplied with a signal in phase with the detection signal or a same signal as the detection signal.

An embodiment of the present invention is a display device with a sensor function. The display device comprises a display panel, a display control circuit for controlling the display panel, a detection device, and a sensor control circuit for controlling the detection device, wherein the detection device has a detection electrode and a shield layer, the detection device is arranged facing a display surface of the display panel, the shield layer is arranged between the display surface and the detection electrode, the sensor control circuit maintains the detection electrode and the shield layer at a constant potential during a display writing period in which the display panel performs display, the display panel stops writing the display during a sensor period in which the detection signal is supplied to the detection electrode, and the shield layer is supplied with a signal in phase with the detection signal or a same signal as the detection signal.

DESCRIPTION OF EMBODIMENTS

Figure 1:
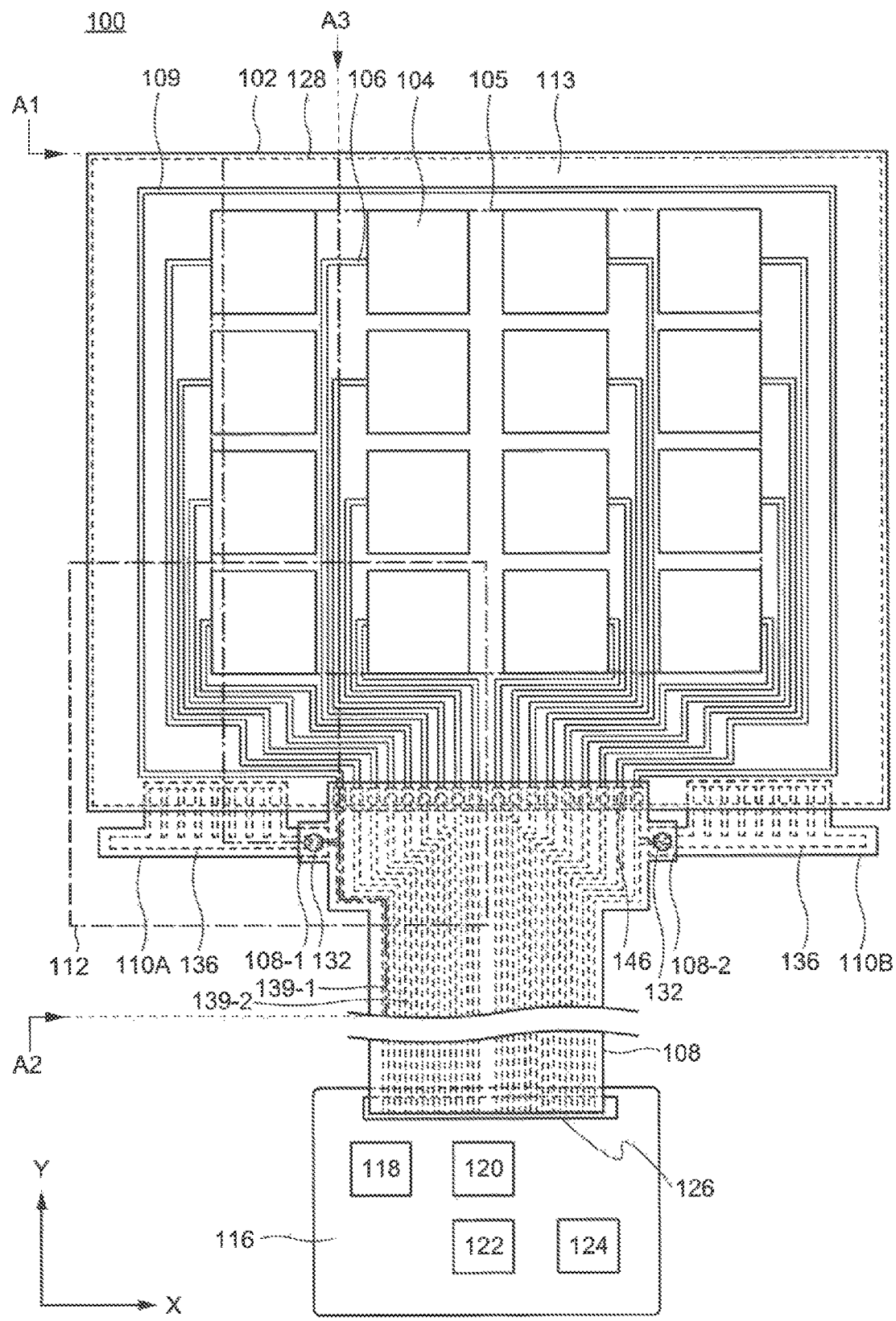
FIG. 1 is a schematic top view of a detection device according to an embodiment of the present invention.

An embodiment of the present invention provides a detection device having a novel configuration, a display device on which the detection device is mounted, and a driving method thereof. In addition, an embodiment of the present invention provides a detection device having excellent detection sensitivity, a display device on which the detection device is mounted, and a driving method thereof. Further, an embodiment of the present invention simplifies a manufacturing process of the display device on which the detection device is mounted.

Hereinafter, embodiments of the present invention will be described with reference to the drawings and the like. However, the present invention can be implemented in various aspects without departing from the gist thereof, and is not to be construed as being limited to the description of the embodiments exemplified below.

In the drawings, although the widths, thicknesses, shapes, and the like of the respective portions may be schematically represented in comparison with the actual embodiments for clarity of explanation, the drawings are merely examples, and do not limit the interpretation of the present invention. In the present specification and the drawings, elements having the same functions as those described with respect to the above-described drawings are denoted by the same symbols, and redundant descriptions thereof may be omitted.

In this specification and claims, in the case where a single film is processed to form a plurality of films, the plurality of films may have different functions and roles. However, the plurality of films is derived from the film formed as the same layer in the same process and has the same material. Therefore, the plurality of films is defined as being present in the same layer.

In this specification and claims, when expressing a state in which a structure is arranged on a certain structure, the term "above" shall include both a state in which a structure is arranged directly above a certain structure and a state in which a structure is arranged above a certain structure via yet another structure, unless otherwise specified.

In this specification and claims, the phrase "a structure is exposed from another structure" means an aspect in which a part of a structure is not covered by another structure, and the part not covered by the other structure includes an aspect covered by yet another structure.

First Embodiment

1. Overall Configuration

In the present embodiment, a structure of a detection device 100 according to an embodiment will be described. As shown in FIG. 1, the detection device 100 includes a sensor substrate 102, a plurality of detection electrodes 104 on a first surface of the sensor substrate 102, a sensor wiring 106 connected to each of the plurality of detection electrodes 104, a flexible printed circuit board (FPC board) 108 electrically connected to the plurality of detection electrodes 104 via the sensor wiring 106, a shield layer 128 arranged on a second surface of the sensor substrate 102, and an FPC board 110 electrically connected to the shield layer 128. The second surface of the sensor substrate 102 is a surface opposite the first surface having the plurality of detection electrodes 104.

The sensor substrate 102 has a sensor area 105 and a picture frame area 113 outside the sensor area 105. The plurality of detection electrodes 104 is arranged in the sensor area 105. The FPC board 108 (a first flexible printed circuit board, hereinafter referred to as a first FPC board 108) electrically connected to the plurality of detection electrodes 104 and at least one the FPC board 110 (a second flexible printed circuit board, hereinafter referred to as a second FPC board 110) connected to the shield layer 128 are arranged in the picture frame area 113.

The first FPC board 108 is located along one side of the substrate 102 and the second FPC board 110 is also located along one side of the substrate 102. In this case, the first FPC board 108 and the second FPC board 110 are arranged side by side along the same one side of the substrate 102. That is, in the case where the X-axis direction and the Y-axis direction are defined as shown in FIG. 1, a second FPC board 110A and the first FPC board 108 are arranged along one side of the substrate 102 in the X-axis direction. As shown in FIG. 1, in the case where a second FPC board 1106 is arranged in the X-axis direction, the second FPC board 110A, the first FPC board 108, and the second FPC board 1106 may be referred to as, for example, a first FPC board, a second FPC board, and a third FPC board in order.

In the above-described lateral arrangement of the first FPC board 108, the second FPC board 110A, and the second FPC board 1106, a first end portion of the first FPC board 108 has a first superimposed part 108-1 that overlaps an end portion of the second FPC board 110A. A second end portion of the first FPC board 108 (an end portion opposite to the first end portion) has a second superimposed part 108-2 that overlaps an end portion of the second FPC board 1106. Due to the above-described overlap, the end portion of the second FPC board 110A and the end portion of the second FPC board 1106 overlapping the superimposed part 108-1 and the second superimposed part 108-2 do not overlap each other in a plan view as shown in FIG. 1.

The first FPC board 108 includes a plurality of terminals 146 and a plurality of wirings 139. A wiring 139-1 among the plurality of wirings 139 is arranged on a side of the first FPC board 108 closer to the second FPC boards 110A and/or 108B. The wiring 139-1 is located on the side of one side extending outward from the sensor substrate 102. The wiring 139-1 is used to electrically connect the first FPC board 108 to the second FPC boards 110A and/or 1106, which will be described later. In FIG. 1, although the wiring 139-1 on a side of the first FPC board 108 closer to the second FPC board 1106 is not described, the wiring 139-1 may also be arranged on a side closer to the second FPC board 1106. In addition, a wiring 139-2 of the plurality of wirings 139 is electrically connected to the sensor wiring 106 via the terminal 146.

The second FPC boards 110A and 1106 have a terminal 136. The terminal 136 is located on the side of one side extending outward from the sensor substrate 102. The second FPC boards 110A and 1106 are electrically connected to the shield layer 128 via the terminal 136. In addition, the second FPC boards 110A and 1106 are also electrically connected to the first FPC board 108 via the terminal 136. In this case, the terminal 136 and the wiring 139-1 are electrically connected to each other.

The second FPC board 110A and the first FPC board 108 are electrically connected in the first superimposed part 108-1 as described above. In addition, the second FPC board 1106 and the first FPC board 108 are electrically connected in the second superimposed part 108-2. Although not shown in detail in FIG. 1, individual wirings are arranged in the first superimposed part 108-1 and the second superimposed part 108-2 of the first FPC board 108. Since the second FPC board 110A and the second FPC board 1106 are electrically connected to the shield layer 128, a predetermined potential can be applied to the shield layer 128 through the first FPC board 108 and the second FPC boards 110A and 1106. The first FPC board 108 includes a terminal (not shown) in a connection part 112. In addition, the second FPC board 110A also includes a terminal (not shown) in the connection part 112. The terminals overlap each other and are electrically connected. The second FPC board 110b and the first FPC board 108 may be electrically connected in the same manner as the connection part 112.

The shield layer 128 may be arranged to overlap the entire surface of the sensor area 105. In this case, the shield layer 128 may not be arranged in all of the picture frame area 113 of the sensor substrate 102. The picture frame area 113 is an area surrounding the sensor area 105 where the plurality of detection electrodes 104 is arranged on the sensor substrate 102. In this case, the plurality of detection electrodes 104 can be arranged in the X-axis direction and the Y-axis direction as shown in FIG. 1. The picture frame area 113 may be an area between the end of the sensor substrate 102 and the sensor area 105 where the plurality of detection electrodes 104 is arranged. The shield layer 128 has at least as many sides as the sensor substrate 102. For example, if the sensor substrate 102 is square, the shield layer 128 may have four sides. Also, the shield layer 128 may be arranged over the entire second surface of the sensor substrate 102, and not only the sensor area 105 but also the shield layer 128 may face all of the picture frame area 113.

At least one sensor wiring 106 is electrically connected to each detection electrode 104. FIG. 1 shows an example configuration of the detection electrode 104 arranged in a row on the sensor substrate 102 and the sensor wiring 106 electrically connected thereto. The detection device 100 shown in FIG. 1 includes a self-capacitive sensor, and as described above, each of the plurality of detection electrodes 104 is individually connected to the sensor wiring 106. As shown in FIG. 1, the sensor wiring 106 is arranged so as to extend in the Y-axis direction with respect to the detection electrode 104 arranged in the X-axis direction and the Y-axis direction. A plurality of sensor wirings 106 is arranged between the plurality of detection electrodes 104 in the Y-axis direction. The plurality of sensor wirings 106 is arranged so that each one is connected to each of the plurality of detection electrodes 104 arranged in the Y-axis direction.

As shown in FIG. 1, a guard wiring 109 may be arranged in the picture frame area 113. The guard wiring 109 may be arranged so as to surround the sensor area 105. The guard wiring 109 may be electrically connected to the first FPC board 108. Although the guard wiring 109 surrounds the four circumferences of the sensor area 105 except for an area between the terminals 146 of the pair of wirings 139-1 in FIG. 1, a configuration that completely surrounds the four circumferences including that area may be adopted. In addition, a configuration in which the guard wiring 109 is interrupted in the middle is also operable.

Although omitted in FIG. 1, the detection device 100 has a cover substrate 114 on the first surface of the sensor substrate 102. The cover substrate 114 covers the upper surface of the detection electrode 104 as indicated by a two-dot chain line in FIG. 3A and FIG. 3B, which will be described later. The cover substrate 114 protects the detection electrode 104 and the construction, such as the sensor wiring 106, on the sensor substrate 102. The cover substrate 114 is preferably arranged so as to cover the sensor area 105 where the detection electrode 104 is arranged and is preferably further arranged so as to cover the picture frame area 113.

As shown in FIG. 1, the detection device 100 further includes a detection circuit board 116. The detection circuit board 116 is electrically connected to the first FPC board 108. The detection circuit board 116 is connected to an external circuit, e.g., a sensor control circuit. A power supply circuit 118, a detector 120, a logic element 122, an interface 124, and the like are arranged in the detection circuit board 116. The power supply circuit 118 converts a power source voltage supplied from the external circuit into a pulsed AC voltage and supplies this AC voltage to each detection electrode 104 via a terminal 126 and the sensor wiring 106. The detector 120, also referred to as an analog front end (AFE), detects a change in capacitance of the detection electrode 104 as a potential fluctuation and digitizes the potential fluctuation into a detection signal. The detection signal generated by the detector 120 is input to the logic element 122, and coordinates representing the position of the input means are generated by the logic element 122 based on the detection signal. The detector 120 and the logic element 122 may be configured as a single integrated circuit (IC) chip. The interface 124 is used to connect to the external circuit and is configured based on standards such as Universal Serial Bus (USB) and Serial Peripheral Interface (SPI).

The detection circuit board 116 may be electrically connected to the second FPC board 110. The detection circuit board 116 may supply a fixed potential (constant potential) such as a reference potential (GND) to the shield layer 128 or a signal in phase with the signal applied to the detection electrode 104 (active shield described later) via the second FPC board 110. In this way, the detection device 100 is controlled by the sensor control circuit.

2. Peripheral Structure 2-1. Peripheral Structure 1

Figure 2:
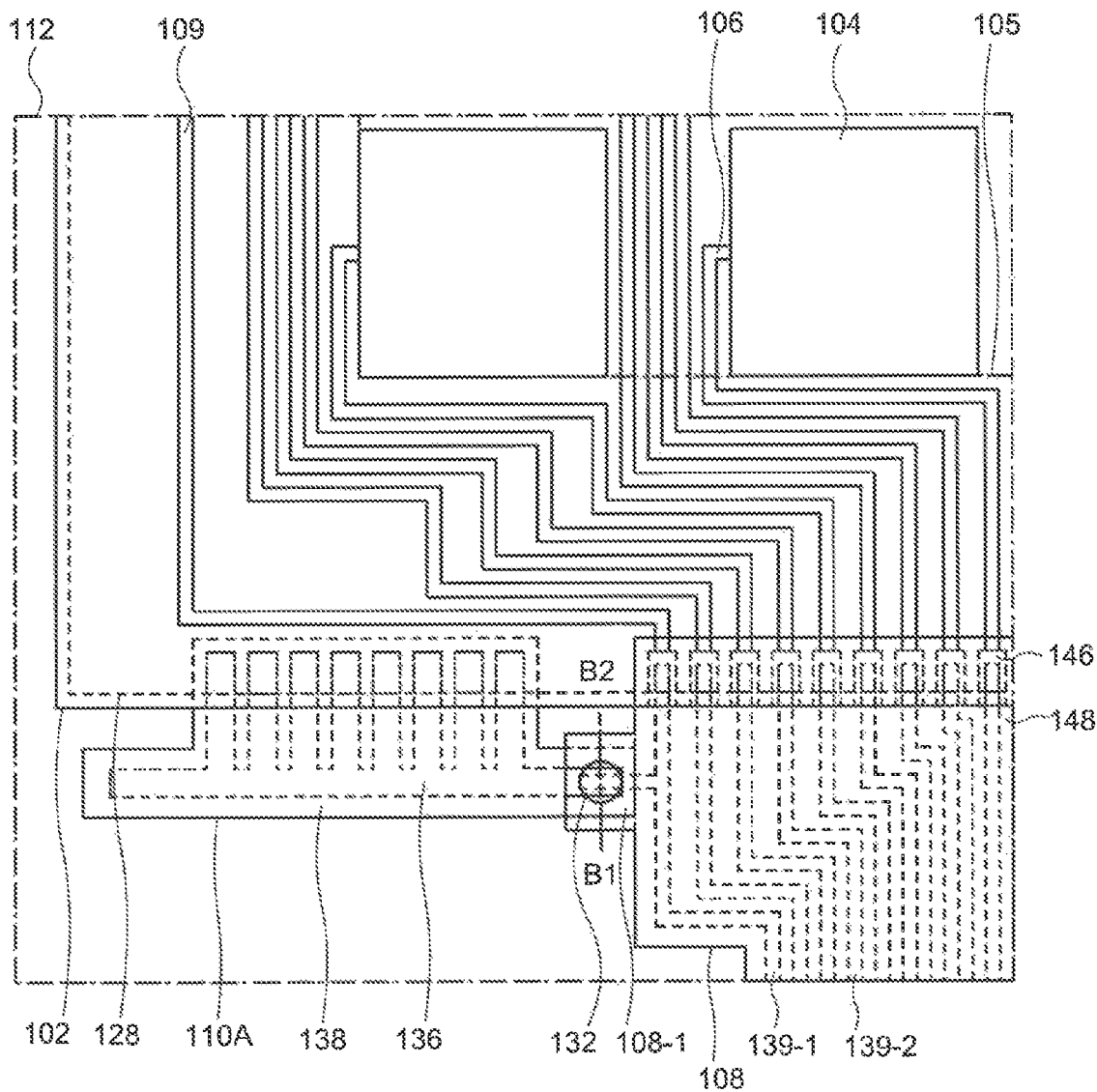
FIG. 2 is a schematic top view of a detection device according to an embodiment of the present invention.

FIG. 2 shows a schematic view of an upper surface of the connection part 112 surrounded by a chain line shown in FIG. 1.

The first FPC board 108 includes the plurality of wirings 139. For example, the first FPC board 108 may include the wiring 139-1 and the wiring 139-2 as shown in FIG. 2. Further, the first FPC board 108 includes the terminal 146 at a position electrically connected to the sensor wiring 106. The terminal 146 may be arranged corresponding to the plurality of sensor wirings 106, and the plurality of wirings 139 is electrically connected to the sensor wirings 106 via the terminal 146. The plurality of wirings 139 is covered with a protective film 148, and a position electrically connected to the terminal 146 is exposed. The terminal 146 may be the position exposed from the protective film 148 of the plurality of wirings 139, and a conductive adhesive or the like may be used to electrically connect the terminal 146 and the sensor wiring 106.

As described above, the first FPC board 108 is electrically connected to the second FPC board 110A via the electrical connection between an end portion of the wiring 139-1 and the terminal 136. In other words, the end portion of wiring 139-1 serves as a terminal, which is not shown in the connection 112 for the first FPC substrate 108 described above. In addition, the wiring 139-1 among the plurality of wirings 139 is electrically connected to the guard wiring 109. Due to these electrical connections, the guard wiring 109 and the shield layer 128 are electrically connected. In addition, the same signal or voltage potential as the signal or voltage potential supplied to the guard wiring 109 can be supplied to the shield layer 128 by these electric connections. Further, the terminal that functions as a source of the signal or voltage potential supplied to the guard wiring 109 and the shield layer 128 can be shared by these electric connections, and the number of connecting terminals can be reduced. A plurality of the wirings 139-1 having such an electrical connection may be arranged according to the number of second FPC boards 110 arranged in the sensor substrate 102, for example, the plurality of wirings 139 may be arranged on a side closer to the second FPC board 110b among the plurality of wirings 139.

As shown in FIG. 2, the second FPC board 110A includes the terminal 136 at a position electrically connected to the shield layer 128. As shown in FIG. 2, the terminal 136 has a slit structure, which improves adhesion between the second FPC board 110A and the shield layer 128. In addition, the terminal 136 is covered with a protective film 138, and a position connected to the shield layer 128 is exposed. As described above, the second FPC board 110A is electrically connected to the first FPC board 108 via the electrical connection between the end portion of the wiring 139-1 and the terminal 136 in the first superimposed part 108-1. As will be described later, a through hole 132 is used for the electrical connection. In addition, the through hole 132 is preferably housed within the first superimposed part 108-1 shown in FIG. 2. Further, the second FPC board 110 may include a marker (not shown). The marker (not shown) may be used, for example, in determining the arrangement of the second FPC board 110 with the first FPC 108 and/or the sensor substrate 102.

2-2. Cross-Sectional Structure 1

Figure 3A:
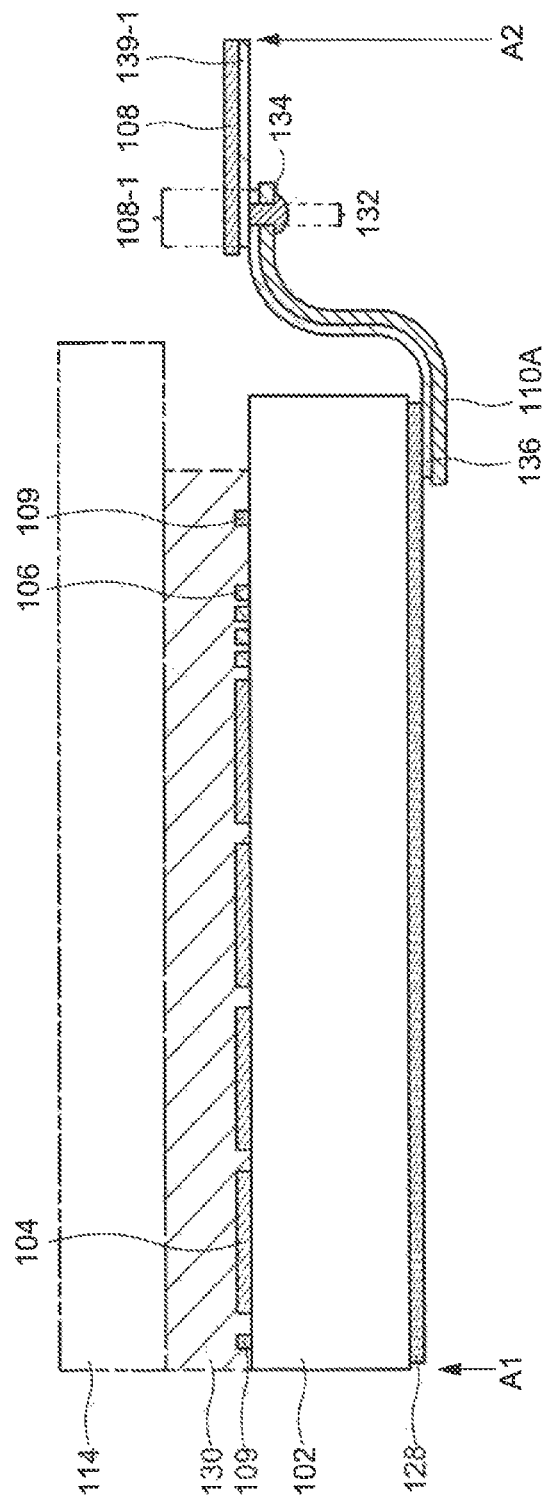
FIG. 3A is a schematic cross-sectional view of a detection device according to an embodiment of the present invention.
Figure 3B:
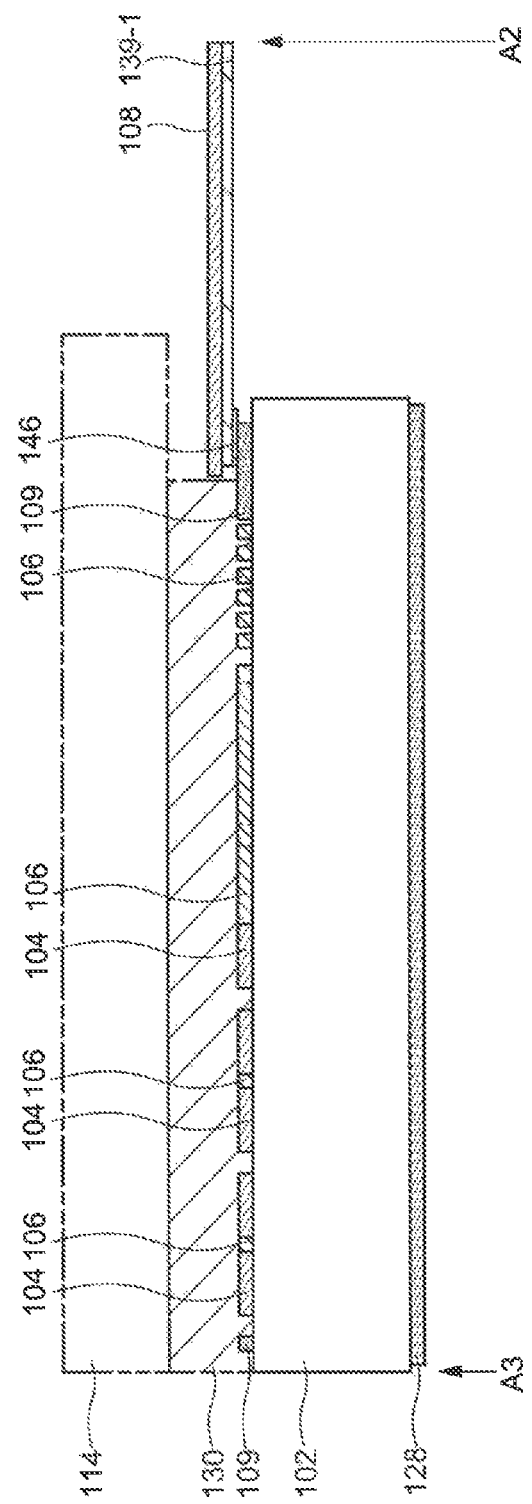
FIG. 3B is a schematic cross-sectional view of a detection device according to an embodiment of the present invention.

FIG. 3A is a schematic cross-sectional view of A1-A2 shown in FIG. 1. FIG. 3B is a schematic cross-sectional view of A3-A2 shown in FIG. 1.

As shown in FIG. 3A and FIG. 3B, the detection electrode 104 is arranged on the sensor substrate 102, and the shield layer 128 is arranged on a surface (second surface) of the sensor substrate 102 opposed to the surface (first surface) of the sensor substrate 102 on which the detection electrode 104 is arranged. Also, in the detection device 100, since the side of the first surface of the sensor substrate 102 on which the detection electrode 104 is arranged is arranged in front of a user, the side of the first surface may be referred to as an upper surface, and the side of the second surface may be referred to as a lower surface.

The shield layer 128 arranged on the second surface of the sensor substrate 102 may be a transparent conductive film. For example, a light transmittance oxide such as indium-tin oxide (ITO) or indium-zinc oxide (IZO) having conductivity can be used. The shield layer 128 may have a single-layer structure or may have a stacked layer structure. The detection device 100 is installed on the upper surface of a display panel and is used as a non-contact-type sensor instead of a conventional touch sensor. In this case, since the detection electrode 104 and the shield layer 128 are formed of a transparent conductive film, the visibility of the display panel can be prevented from being impaired. Although the shield layer 128 is arranged on a larger area than the detection electrode 104, since the transparent conductive film has a relatively higher resistance, a lower resistance may be achieved by a metal film as will be described later. In this case, the metal film is preferably arranged on the picture frame area 113, and in the case where the metal film is arranged on the sensor area 105, the metal film is preferably formed in a thin line pattern so as not to affect visibility. Examples of the metal include a metal of molybdenum and aluminum (a zero-valent metal). Further, the shield layer 128 may be any layer having light transmittance and conductivity and may be referred to as a transparent conductive layer. The shield layer 128 is covered with a protective film 130, which will be described later.

A distance between the detection electrode 104 arranged on the first surface of the sensor substrate 102 and the shield layer 128 arranged on the second surface of the sensor substrate 102 can be set to 0.3 mm or more and 10 mm or less. This distance may be the thickness of the sensor substrate 102. Setting the distance between the detection electrode 104 arranged on the first surface of the sensor substrate 102 and the shield layer 128 arranged on the second surface of the sensor substrate 102 to 0.3 mm or more appropriately reduces the parasitic capacitance between the detection electrode 104 and the shield layer 128. In this regard, it is most preferable to set the distance between the detection electrode 104 and the shield layer 128 to 0.3 mm or more. However, considering the potential applied to the detection electrode 104 and the shield layer 128, and the standard of the sensor substrate 102 and the like, the distance can be set to 0.25 mm or more or 0.2 mm or more. In addition, if the distance between the detection electrode 104 arranged on the second surface of the sensor substrate 102 and the shield layer 128 arranged on the first surface of the sensor substrate 102 is too long, it may visually affect the appearance or affect the weight. In addition, if the distance between the detection electrode 104 and the shield layer 128 is too long as described above, the thickness of the sensor substrate 102 may be relatively large, and the electric field shielding property of the shield layer 128 may not be sufficiently effective with respect to the detection electrode 104. In view of this, the distance between the detection electrode 104 arranged on the first surface of the sensor substrate 102 and the shield layer 128 arranged on the second surface of the sensor substrate 102 may be set to 10 mm or less. Visual effects include, for example, poor appearance, and thickening of the detection device 100 and the like. In addition, visual effects also include a light reflection problem and the like.

A conductive oxide or the like that transmits visible light can be used as the detection electrode 104 arranged on the first surface of the sensor substrate 102, and for example, may be an ITO or IZO. The detection electrode 104 may have a single-layer structure or may have a stacked layer structure.

The sensor wiring 106 arranged on the first surface of the sensor substrate 102 and electrically connected to the detection electrode 104 may have the same composition as the detection electrode 104. Since the detection electrode 104 and the sensor wiring 106 have the same composition, resistance between the detection electrode 104 and the sensor wiring 106 can be prevented from increasing. In addition, as shown in FIG. 3A and FIG. 3B, the detection electrode 104 and the sensor wiring 106 may be arranged in the same layer. In this case, the detection electrode 104 and the sensor wiring 106 are simultaneously formed in the same process.

The protective film 130 is arranged on the sensor wiring 106 and the detection electrode 104. The protective film 130 has a single-layer structure or a stacked layer structure and is formed of a film containing a silicon-containing inorganic compound or a resin such as an epoxy-resin, an acryl-resin or a silicone-resin. In FIG. 3A and FIG. 3B, a single-layer protective film 130 is exemplified. The resin-containing protective film 130 also functions as a flattening film. Further, the protective film 130 covers the detection electrode 104 and thus functions as a corrosion-preventing film of the detection electrode 104. In addition, a terminal part is formed on one end portion of the sensor wiring 106, and the terminal part is exposed from the protective film 130. Then, the exposed terminal part is connected to the first FPC board 108 via a conductive adhesive or the like. The cover substrate 114 is fixed on the protective film 130 via an adhesive layer that transmits visible light (not shown). The adhesive layer may be, for example, an optical clear pressure sensitive adhesive (OCA) or the like.

The sensor substrate 102 and the cover substrate 114 may be made of a material that transmits visible light. The material that transmits visible light is made of, for example, glass, quartz, or a polymer material such as polyimide, polyamide, or polycarbonate.

As shown in FIG. 3B, the first FPC board 108 is arranged between the cover substrate 114 and the sensor substrate 102. In addition, the first FPC board 108 may be arranged adjacent to the protective film 130. As described above, the first FPC board 108 may be electrically connected to a position of the guard wiring 109 that is partially exposed from the protective film 130. In this case, the first FPC board 108 may be electrically connected to the guard wiring 109 via the wiring 139-1 included in the first FPC board 108.

In the second FPC board 110A, the surface electrically connected to the shield layer 128 and the surface electrically connected to the first FPC board 108 are the same surface. For example, as shown in FIG. 3A, the shield layer 128 is arranged on the second surface of the sensor substrate 102, and the wiring 139-1 is arranged on the second surface of the first FPC board 108. The terminal 136 of the second FPC board 110A is arranged on an upper surface of the second FPC board 110A and electrically connected to the wiring 139-1 and the terminal 136 at the first surface of the second FPC board 110A. In addition, in the first FPC board 108, the surface electrically connected to the sensor wiring 106 and the surface electrically connected to the second FPC board 110A are the same surface. For example, as shown in FIG. 3B, the sensor wiring 106 is arranged on the upper surface of the sensor substrate 102, and as shown in FIG. 3A, the terminal 136 of the second FPC board 110A is arranged on the upper surface of the second FPC board 110A. The wiring 139 of the first FPC board 108 is arranged on the lower surface of the first FPC board 108 and is electrically connected to the terminal 136 and the sensor wiring 106 on the lower surface of the first FPC board 108.

As described above, the second FPC board 110A may be electrically connected to the first FPC board 108 via the terminal 136 in the first superimposed part 108-1. In this case, the second FPC board 110A electrically connected to the shield layer 128 can be electrically connected to the terminal of the first FPC board 108 by filling the through hole 132 of the terminal 136 in the first superimposed part 108-1 with a conductive material. The end portion of the wiring 139-1 can be used as the terminal of the first FPC board 108. Examples of a conductive material 134 that fills the through hole 132 includes an alloy containing lead, tin, and the like, and an alloy containing tin, silver, and the like.

As shown in FIG. 3B, the first FPC board 108 is arranged between the cover substrate 114 and the sensor substrate 102. In addition, the first FPC board 108 may be arranged adjacent to the protective film 130 in a cross-sectional view. The first FPC board 108 may be electrically connected to a position of the guard wiring 109 that is partially exposed from the protective film 130. In this case, the first FPC board 108 may be electrically connected to the guard wiring 109 via the wiring 139-1 included in the first FPC board 108.

2-3. Cross-Sectional Structure 2

Figure 4:
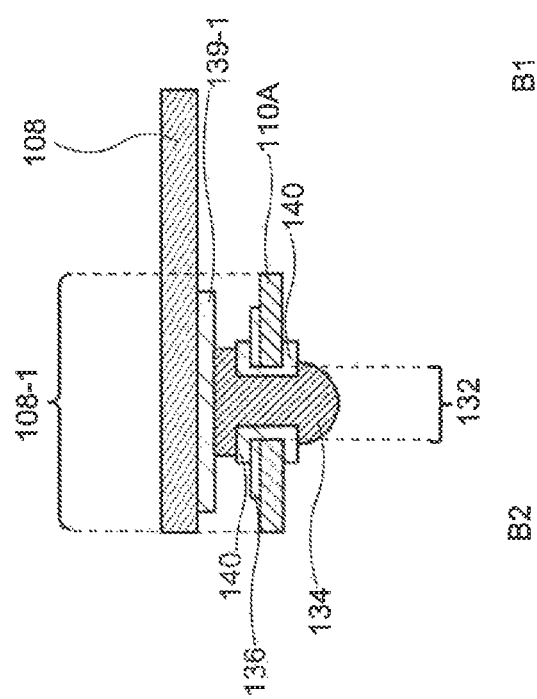
FIG. 4 is a schematic cross-sectional view of a detection device according to an embodiment of the present invention.

FIG. 4 shows a schematic view of a cross section along the chain line B1-B2 shown in FIG. 2. The second FPC board 110A has the terminal 136. The terminal 136 is connected to the first FPC board 108 via the through hole 132 of the first FPC board 108. The through hole 132 is filled with the conductive material 134 so that the second FPC board 110A is electrically connected to the first FPC board 108, as described above. The through hole 132 is arranged so as to fit in the first superimposed part 108-1. Further, a conductor 140 is arranged so as to cover the peripheral wall and the upper and lower opening edges of the through hole 132. The conductor 140 is electrically connected to the wiring 139-1 of the first FPC board 108 by filling the conductive material 134 in the through hole 132. In addition, the conductor 140 may have a direct and electrical connection with the terminal 136 to further supplement the electrical connection between the terminal 136 and the wiring 139-1. In particular, in the case where the second FPC board 110 is arranged between the terminal 136 and the second first FPC board 108, the electrical connection between the terminal 136 and the wiring 139-1 can be further supplemented.

The detection device 100 includes a contact-type sensor or a non-contact-type sensor. The contact-type sensor can identify a position where a finger or a hand of a person or an input device such as a touch pen directly contacts the sensor. The non-contact-type sensor can identify the position by being positioned in the vicinity of the sensor without direct contact with a finger or a hand of a person or an input jig such as a touch pen. In the case where the detection device 100 includes a non-contact-type sensor, it may include a hover sensor.

3. Modification of Shield FPC Board

In the following explanation, for the sake of convenience, a position where the second FPC board 110 of the detection device 100 is arranged is defined as a lower portion of the shield layer, and the opposite side is defined as an upper portion. In the case where the sensor substrate 102 or the display panel can be regarded as a rectangle mainly composed of four sides, each of the four sides is called a side.

3-1. Modification 1

Figure 5:
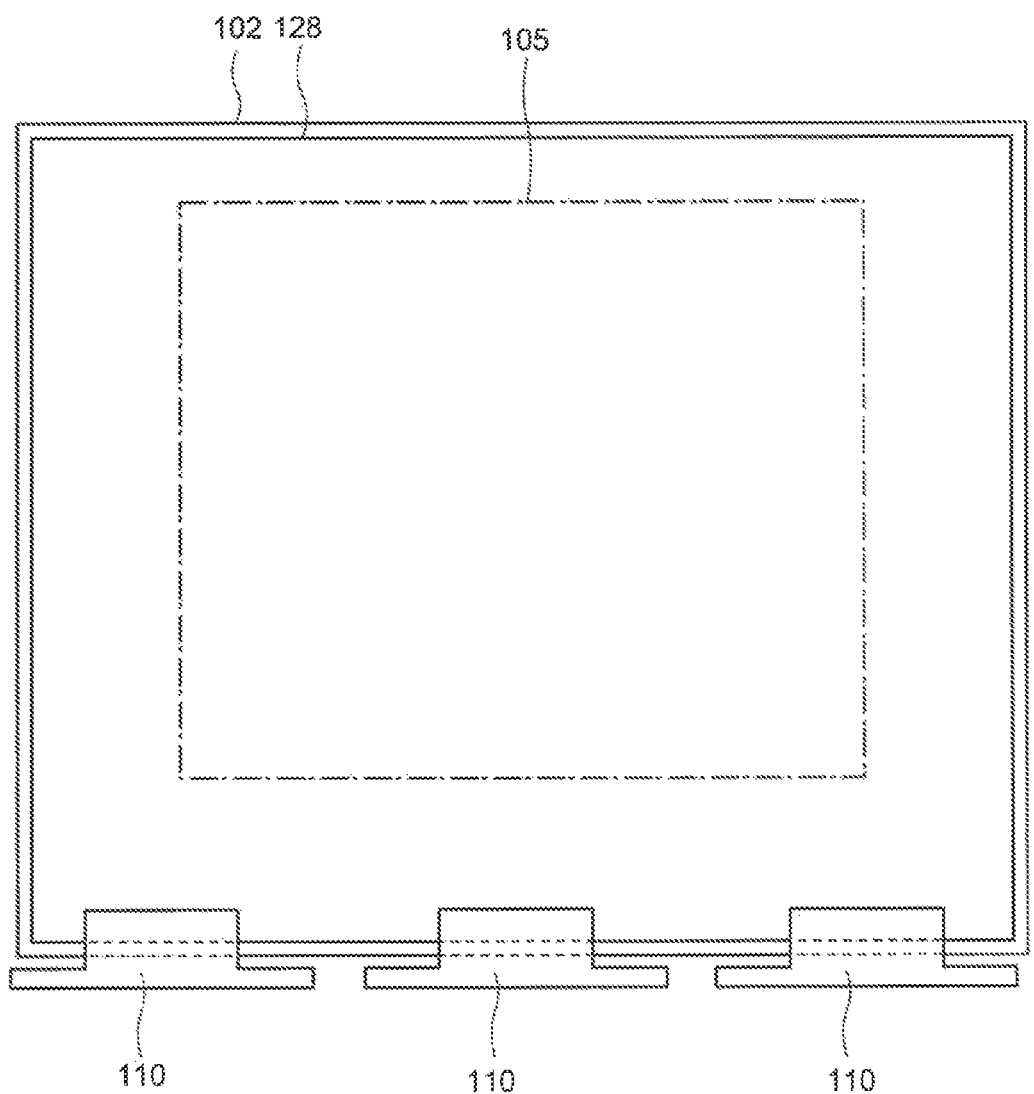
FIG. 5 is a schematic bottom view of a detection device according to an embodiment of the present invention.

In the detection device 100, as shown in FIG. 5, the three second FPC boards 110 may be arranged for the shield layer 128. As described above, the shield layer 128 is arranged over the entire surfaces of the sensor area 105 and the sensor substrate 102. The present invention is not limited to this configuration, and a configuration in which the shield layer 128 is not partially arranged outside the sensor substrate 102 may be adopted. As shown in FIG. 5, the plurality of second FPC boards 110 may be arranged along one side of the shield layer 128. Although the example in which three second FPC boards 110 are arranged is shown in FIG. 5, three or more second FPC boards 110 may also be arranged, and at least two or more second FPC boards 110 are preferred, as shown in FIG. 1. Providing the plurality of second FPC boards 110 makes it possible to reduce the connection resistance between the shield layer 128 and the second FPC board 110.

3-2. Modification 2

Figure 6:
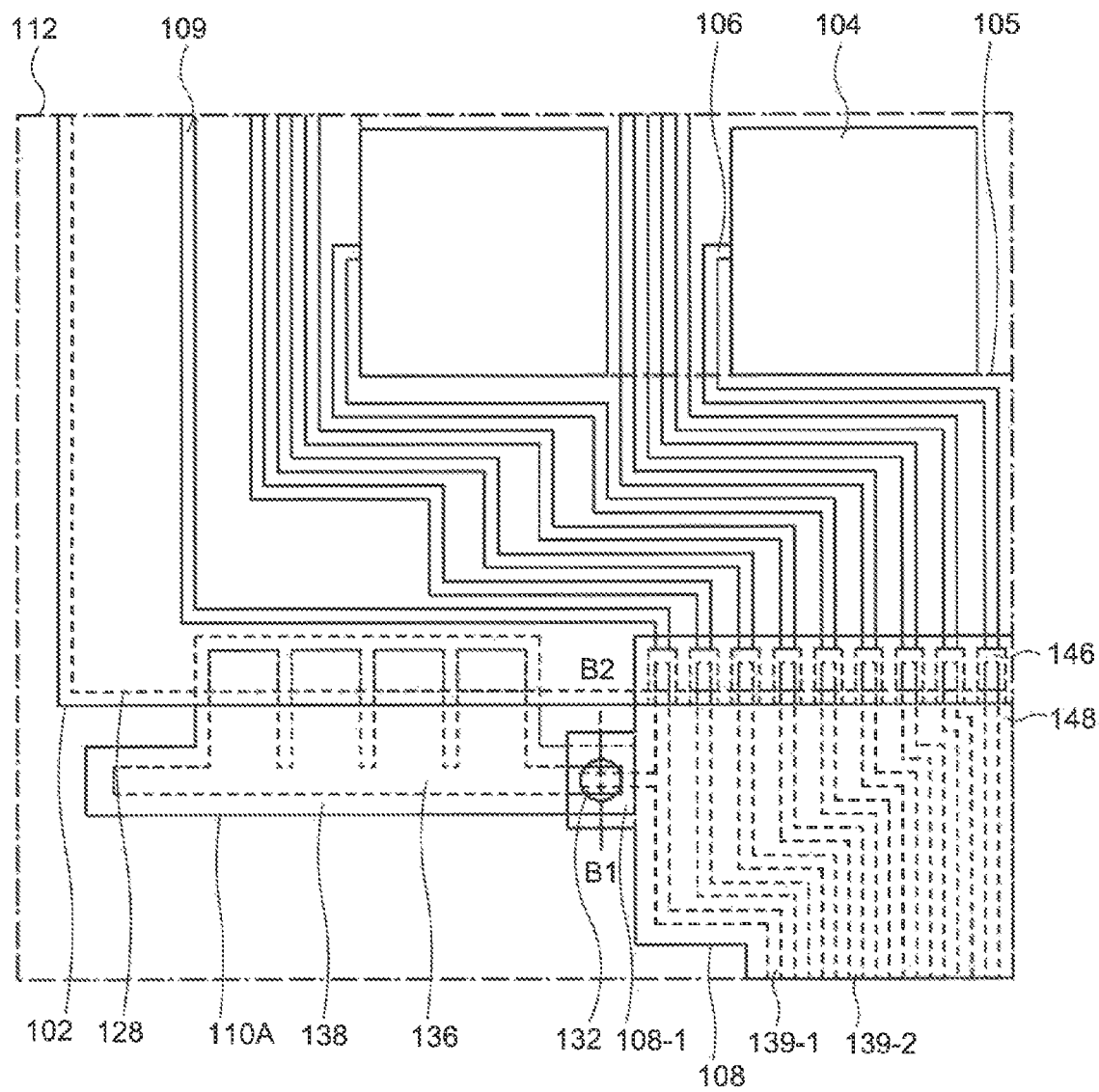
FIG. 6 is a schematic top view of a detection device according to an embodiment of the present invention.

In the detection device 100, as shown in FIG. 6, a width of the terminal 136 included in the second FPC board 110 is wider than a width of the terminal 146 included in the first FPC 108. A width of a slit of the terminal 136 of the second FPC board 110A is narrower than a width between the plurality of terminals 146 of the first FPC board. The narrow slit of the terminal 136 increases the contact area between the shield layer 128 and the terminal 136 and reduces the contact resistance between the shield layer 128 and the second FPC board 110.

4. Modification of Shield Layer

4-1. Modification 1 of Shield Layer

Figure 7:
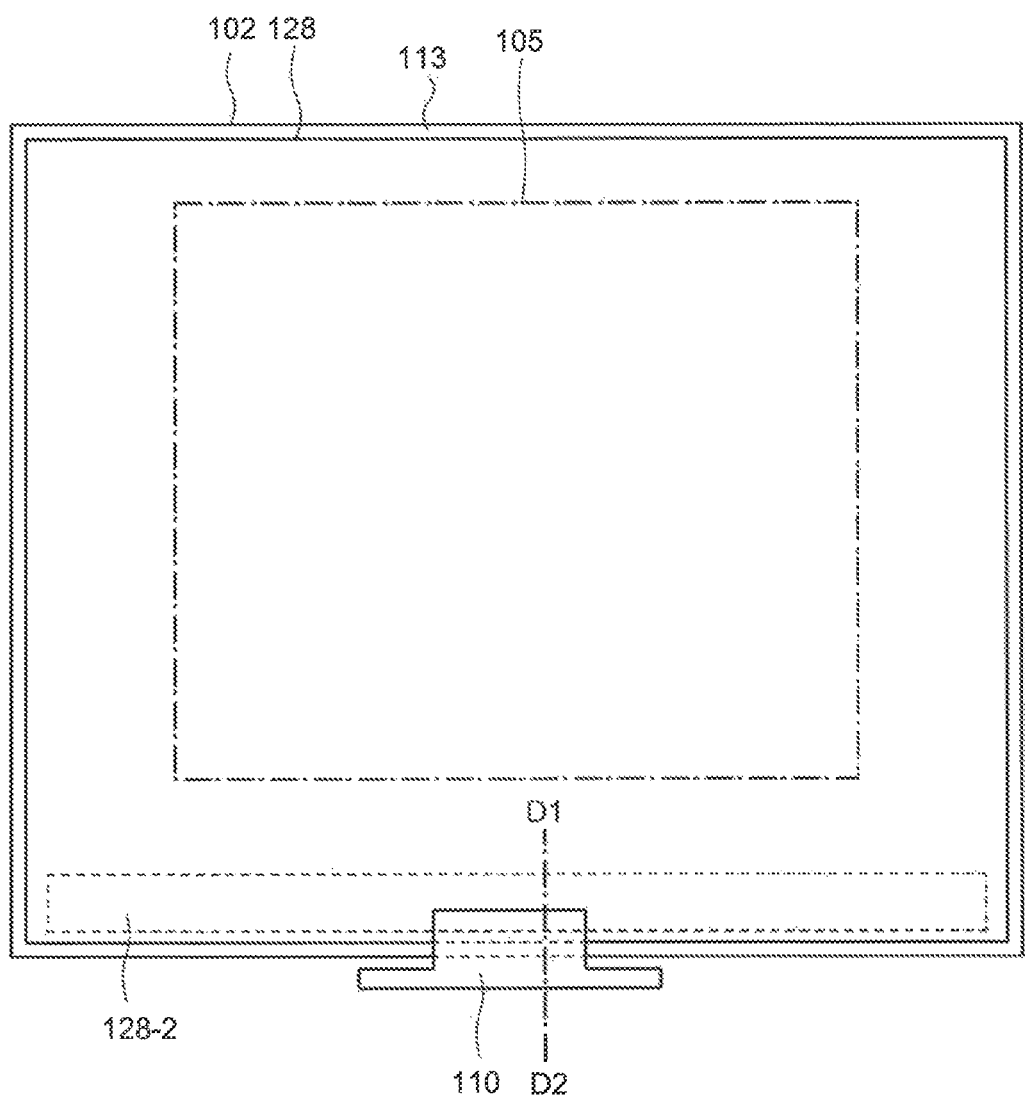
FIG. 7 is a schematic bottom view of a detection device according to an embodiment of the present invention.

The detection device 100 may include a plurality of stacked shield layers 128, for example, as shown in FIG. 7, a shield layer 128-1 and a shield layer 128-2 may be partially stacked. As shown in FIG. 7, the shield layer 128-1 is arranged on a side closer to the second surface of the sensor substrate 102. In this case, as described above, the plurality of stacked shield layers 128 may not be arranged in all of the picture frame area 113 of the sensor substrate 102. The shield layer 128-1 among the stacked plurality of shield layers 128 may have at least four sides, and the second FPC board 110 is electrically connected to one side of the four sides. The shield layer 128 may include the above-described conductive oxide or metal that transmits visible light. In particular, in the case where a conductive oxide is used for the shield layer 128-1 and a metal is used for the shield layer 128-2, it is preferable that the shield layer 128-1 covers the shield layer 128-2. That is, the shield layer 128-1, which is a transparent conductive layer, covers the shield layer 128-2, which is a metal layer. With such a structure, corrosion of the shield layer 128-2 using metal can be prevented. In addition, a protective film (not shown) may be arranged so as to cover the shield layer 128-1. In this case, an insulating film such as silicon nitride or silicon oxide can be used as the protective film.

As shown in FIG. 7, the shield layer 128-2 is arranged in a band shape along one side of the shield layer 128-1. In this case, the shield layer 128-2 is arranged inside the outermost periphery of the shield layer 128-1. In addition, the shield layer 128-1 is a length that is longer than a width of the second FPC board 110 and covers the entire side of the second surface of the sensor substrate 102. Alternatively, the shield layer 128-1 is long enough to accommodate the plurality of second FPC substrates 110 and covers the entire side of the second surface of the sensor substrate 102. In the case where the shield layer 128-2 is a metal layer as described above, the shield layer 128-1 completely covers the shield layer 128-2. As a result, the shield layer 128-2, which is the metal layer, is not exposed.

As described above, the shield layer 128-2 is long and is arranged on a side where the second FPC board 110 is arranged, whereby the number of second FPC boards 110 can be reduced, and the entire shield layer 128-1 can be reduced in resistance. In particular, in the case where the detection device 100 is mounted on the display panel and a liquid crystal such as the FFS method or the like is used for the display panel, the shield layer 128 functions as an antistatic layer and can block noise from the display panel.

Figure 8:
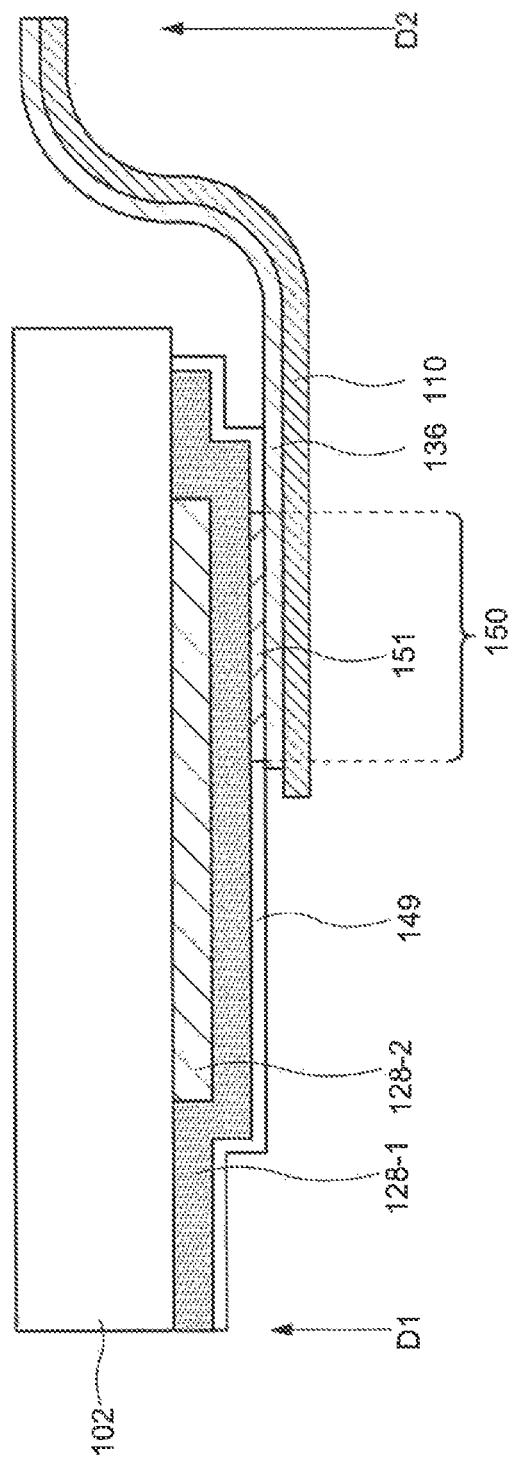
FIG. 8 is a schematic cross-sectional view of a detection device according to an embodiment of the present invention.

FIG. 8 is a schematic view of a cross section between D1-D2 shown in FIG. 7. The shield layer 128-1 is arranged in the sensor area 105 as described above and is further arranged between the shield layer 128-2 and the second FPC board 110 as shown in FIG. 8. Further, a protective film 149 is arranged so as to cover the shield layer 128-1. The second FPC board 110 is arranged so as to cover the shield layer 128-2 or so as to overlap the shield layer 128-2 and is electrically connected to the shield layer 128-2 via the shield layer 128-1. As a result, the shield layer 128-2 can function as an auxiliary electrode of the shield layer 128-1, and resistance of the shield layer 128-1 can be reduced. In addition, an aperture area (not shown) may be formed on the shield layer 128-1 and the protective film 149 on the shield layer 128-2, and the second FPC board 110 may be directly or electrically connected to the shield layer 128-2. In this case, the aperture area may be filled with a conductive material such as a conductive material.

As shown in FIG. 8, the shield layer 128 is covered with the protective film 149. The protective film 149 may cover end portions of the shield layer 128-1 and the shield layer 128-2. The protective film 149 is arranged between the second FPC board 110 and the shield layer 128 and is arranged between the shield layer 128-1 and the second FPC board 110 in the case where the shield layer 128 has a stacked layer structure.

Further, the protective film 149 has an aperture area 150 between the second FPC board 110 and the shield layer 128-2, and the terminal 136 of the second FPC board 110 is connected to the shield layer 128 via the aperture area. In addition, the aperture area 150 may be filled with a material 151 having conductivity such as a conductive material, and the second FPC board 110 may be electrically connected to the shield layer 128-1 via the conductive material 151.

In the case where the size of the detection device 100 is increased, the sensor area 105 and the shield layer 128-1 also have areas corresponding to the enlarged detection device 100. In this case, as described above, arranging the shield layer 128-2 makes it possible to reduce the resistance of the entire shield layer 128.

4-2. Modification 2 of Shield Layer

Figure 9:
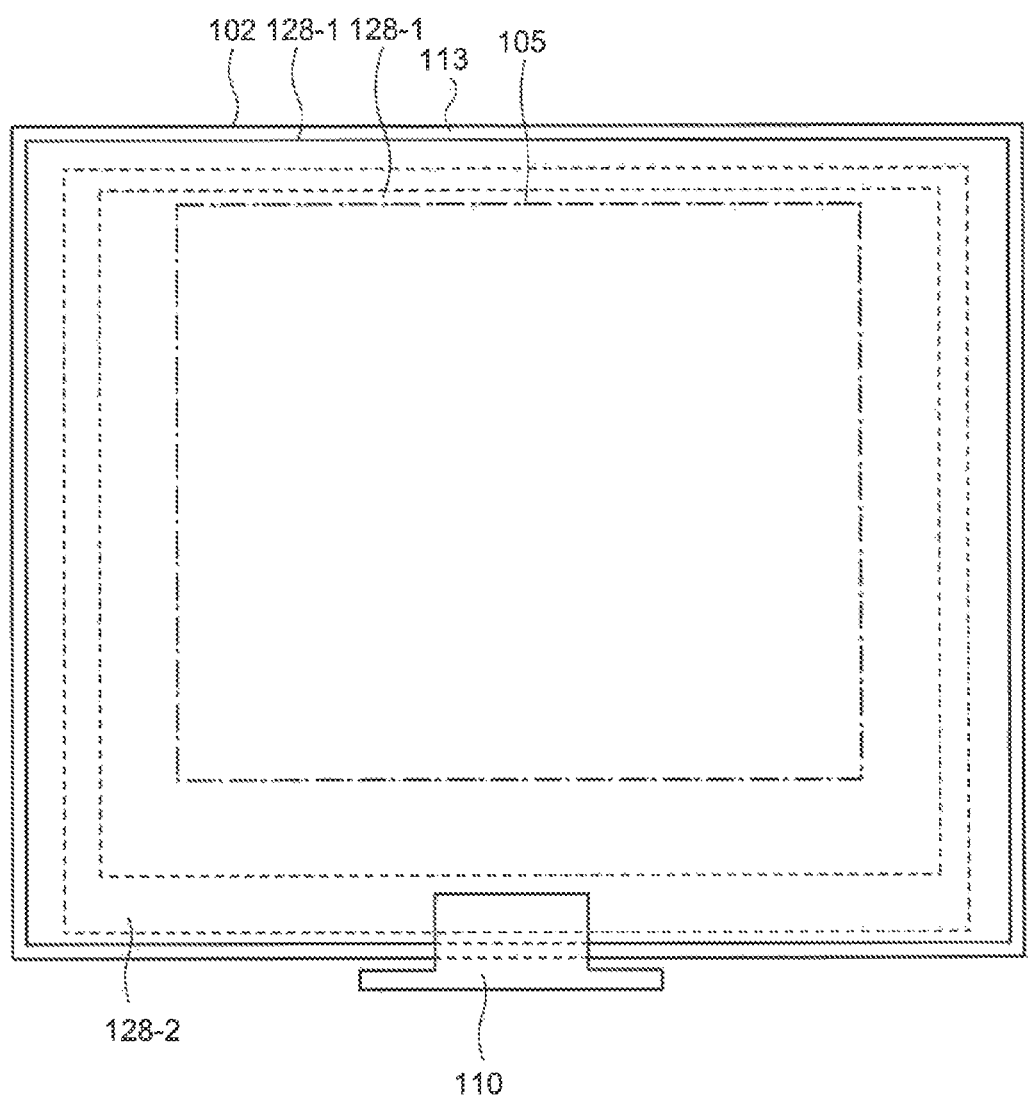
FIG. 9 is a schematic bottom view of a detection device according to an embodiment of the present invention.

The detection device 100 includes the stacked shield layer 128-1 and the shield layer 128-2. The shield layer 128-1 is arranged in the sensor area 105 as described above. As shown in FIG. 9, the shield layer 128-2 is arranged so as to surround the outer periphery of the sensor area 105. The shield layer 128-2 is formed in a frame shape, and an area within the frame is wider than the sensor area 105. In other words, the shield layer 128-2 has an opening that is wider than the sensor area 105. The area of the opening is located inside the outer periphery of the shield layer 128-1 or the peripheral edge of the shield layer 128-1. In addition, the area of the opening overlaps the sensor area 105. The shield layer 128-2 is arranged in the picture frame area 113 of the sensor substrate 102. As a result, a shield potential can be supplied to the shield layer 128-1 located far from the second FPC board 110 without any delay. In addition, even if the shield layer 128-1 is within that area, the shield potential can be swung in synchronization with the detection electrode 104, and the generation of capacitance between the shield layer 128-1 and a detection electrode 204 can be suppressed. Further, in the case where the detection device 100 is mounted on the display panel, the shield layer 128-2 having the metal layer is arranged in the frame area, and thus the resistance of the shield layer 128 can be reduced without hindering the visibility of the display panel.

4-3. Modification 3 of Shield Layer

Figure 10:
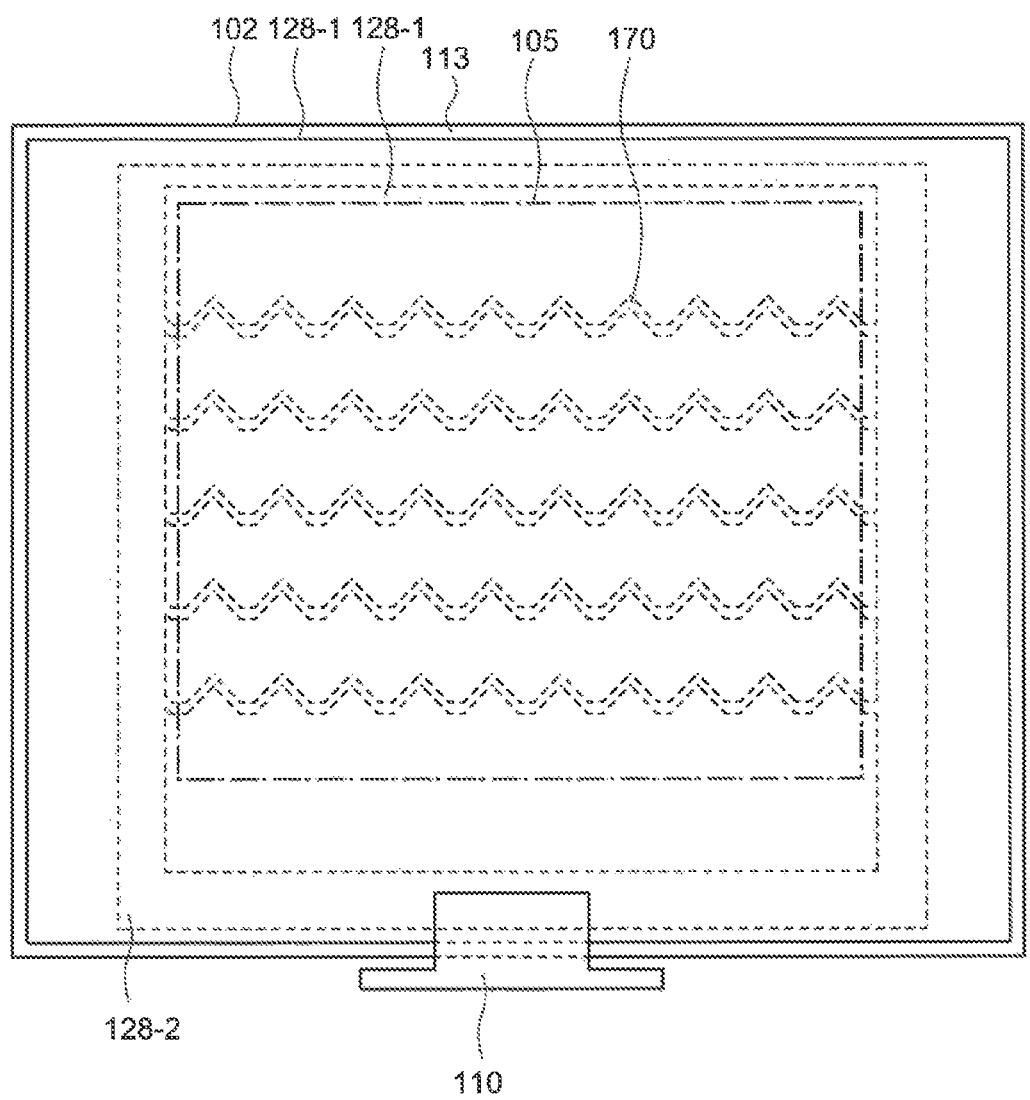
FIG. 10 is a schematic bottom view of a detection device according to an embodiment of the present invention.
Figure 15:
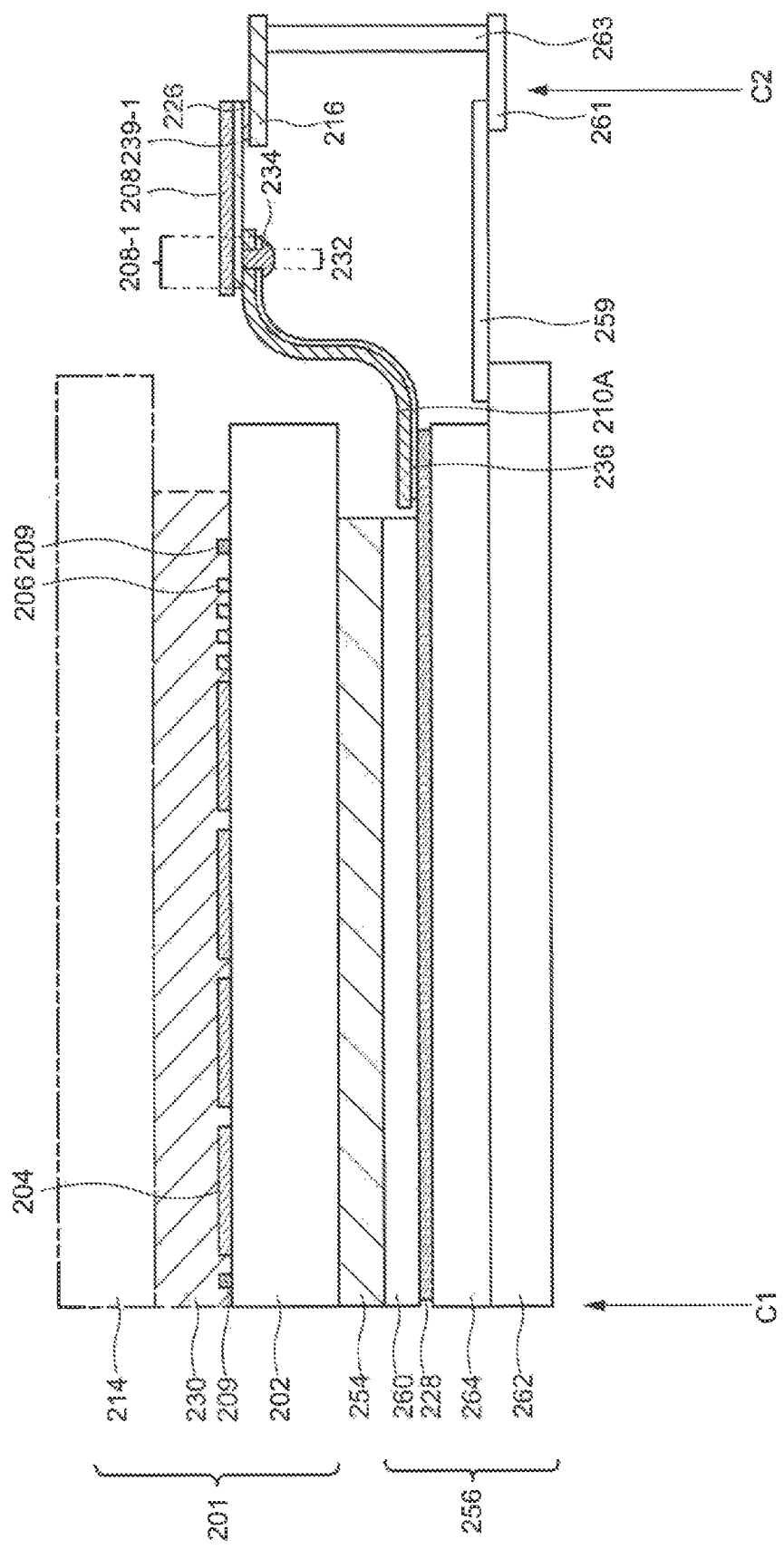
FIG. 15 is a schematic cross-sectional view of a detection device according to an embodiment of the present invention.

The detection device 100 includes the stacked shield layer 128-1 and the shield layer 128-2. As shown in FIG. 10, the shield layer 128-2 is arranged so as to surround the outer periphery of the sensor area 105, and the sensor area 105 further includes a plurality of auxiliary wirings 170 of the shield layer 128-2. In FIG. 15, in the case where the second FPC board 210 is electrically connected to the lower portion of the shield layer 128-2, the auxiliary wiring 170 is arranged on the sensor area 105 in a transverse direction. In addition, each auxiliary wiring 170 extends in the transverse direction of the sensor area 105 and is formed side by side in a longitudinal direction.

In the case where the detection electrode 104 is formed into a mesh shape by a thin metal wire or the like, the auxiliary wiring 170 is also formed into a mesh shape by a similar thin metal wire or the like, and the upper and lower positions thereof are aligned (overlapping each other). In the case where the detection device 100 is mounted on the display panel, the lowering of the transparency of the detection device 100 is suppressed by the matching of the upper and lower positions. In this case, the auxiliary wiring 170 is arranged or the number of auxiliary wirings 170 is adjusted so that moiré does not occur in the mesh-like detection electrode 104 and the auxiliary wiring 170.

Further, in the case where the detection device 100 is mounted on the display panel, the auxiliary wiring 170 is arranged so as to cross or traverse the display area of the display panel. The auxiliary wiring 170 may be arranged between adjacent pixels included in the display panel, for example, between a first pixel and a second pixel. The auxiliary wiring 170 will pass between adjacent pixels of the plurality of pixels making up the display panel. As described above, arranging the auxiliary wiring 170 between adjacent pixels makes it possible to visually recognize the image of the display panel without disturbing the image. The number of auxiliary wirings 170 is adjusted so that moiré does not occur in the pixels and the auxiliary wiring 170.

The auxiliary wiring 170 may be made of the same material as the shield layer 128-2, and the auxiliary wiring 170 may be formed in the same process as the shield layer 128-2.

4-4. Modification 4 of Shield Layer

Figure 11:
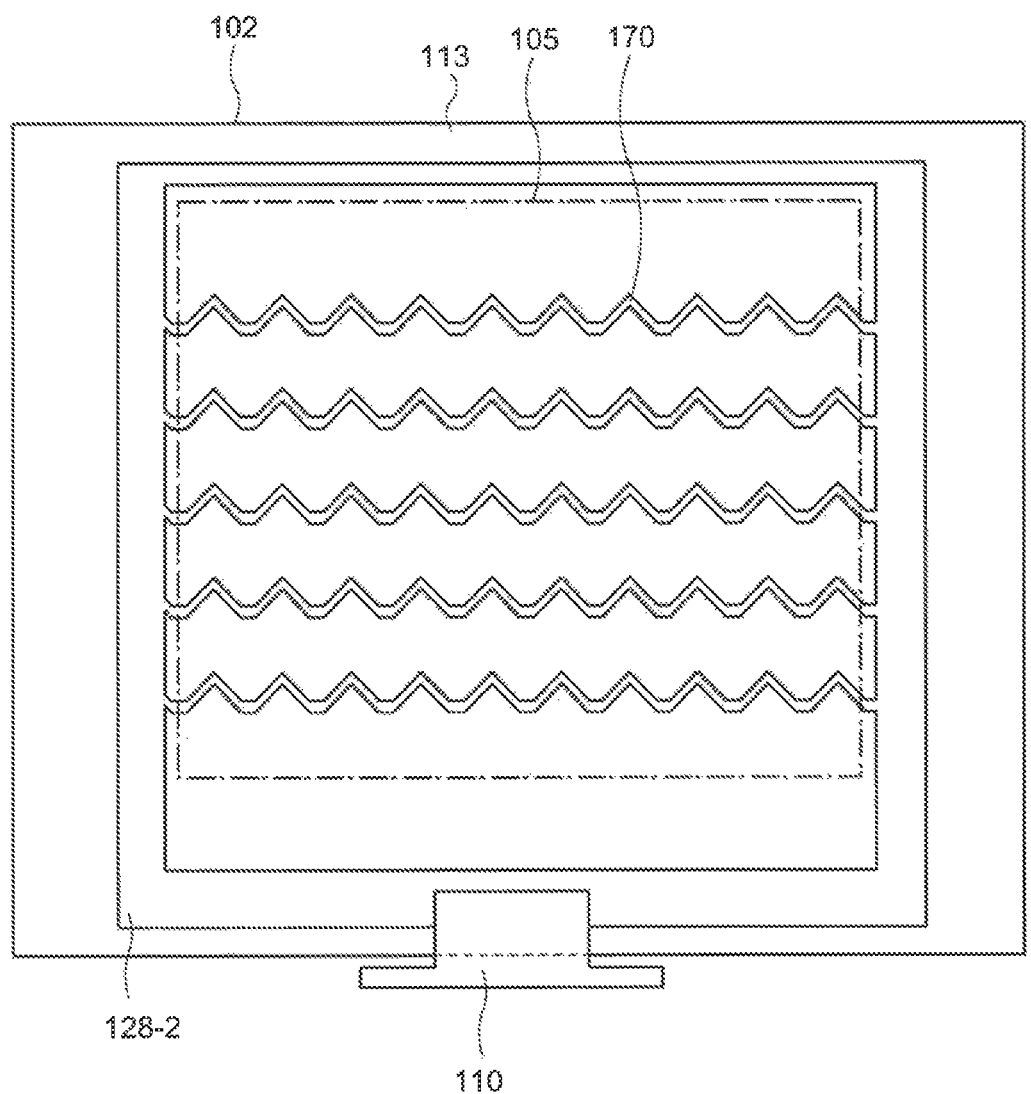
FIG. 11 is a schematic bottom view of a detection device according to an embodiment of the present invention.

As shown in FIG. 11, the detection device 100 does not include the shield layer 128-1 arranged on the entire sensor area 105 but includes the shield layer 128-2. In this case, the shield layer 128-2 has the same configuration as the metal layer described above. Therefore, the shield layer 128-2 may be referred to as the metal layer 128-2. The metal layer 128-2 is arranged so as to surround the outer periphery of the sensor area 105. The metal layer 128-2 may have an opening that is wider than the sensor area 105. Therefore, the area of the opening overlaps the sensor area 105, and the sensor area 105 is located within the area of the opening in plan view. The metal layer 128-2 has the plurality of auxiliary wirings 170. The plurality of auxiliary wirings 170 may be arranged in the transverse direction or longitudinal direction, or in both directions, as described above. The plurality of auxiliary wirings 170 extends from one side of the opening of the metal layer 128-2 toward the other side. The auxiliary wiring 170 may be arranged with an interval where an electric field is generated in the adjacent auxiliary wiring 170. As a result, the sensor area 105 and the shield layer 128 can be used in the enlarged detection device 100 without arranging the shield layer 128 over the entire surface of the sensor area 105 and without stacking the shield layer 128.

As described above, in the case where the shield layer 128 does not have a stacked layer structure and is formed only by the metal layer of the shield layer 128-2, the protective film 149 is formed so as to cover the shield layer 128-2. In addition, the protective film 149 is arranged so as to cover the shield layer 128-2 and the auxiliary wiring 170. The shield layer 128-2 and the auxiliary wiring 170 can be prevented from being corroded by covering the shield layer 128-2 and the auxiliary wiring 170 with the protective film 149.

5. Display Device

Figure 12:
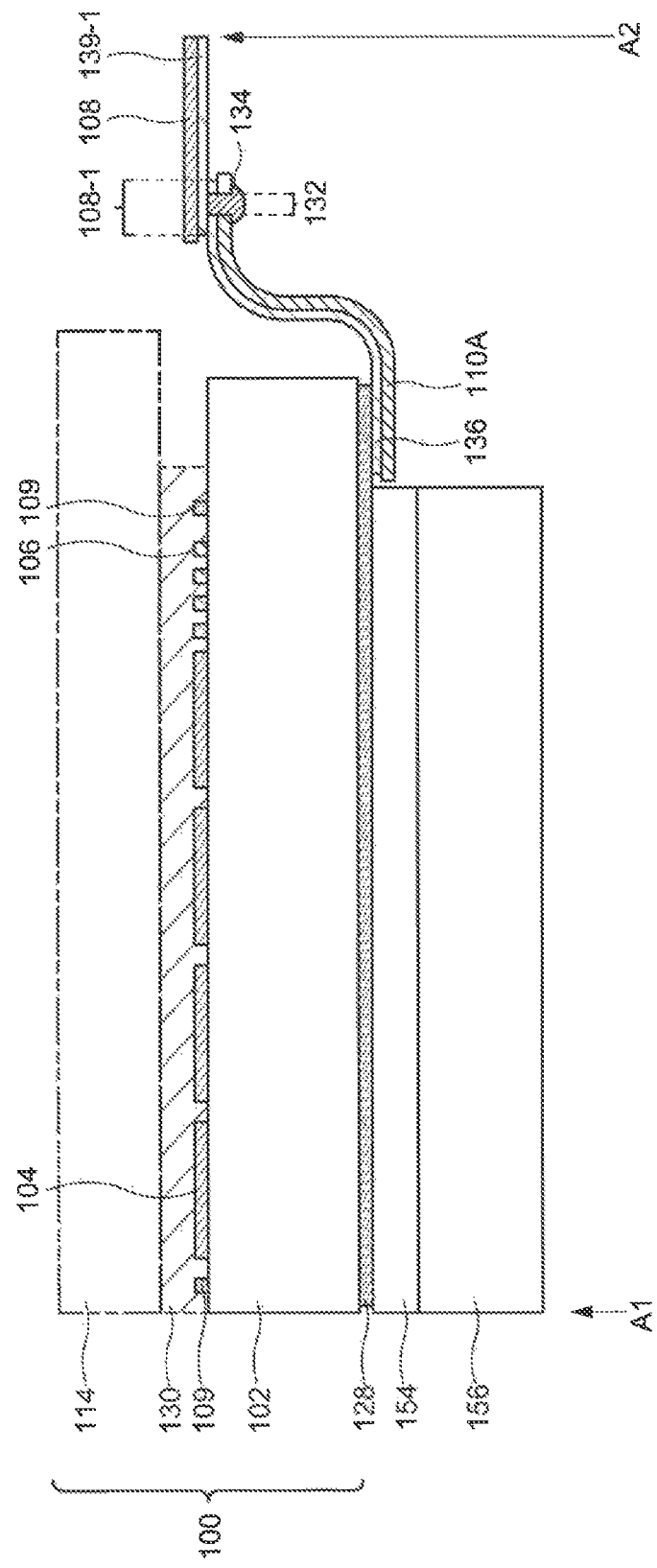
FIG. 12 is a schematic cross-sectional view of a detection device according to an embodiment of the present invention.

FIG. 12 is a schematic view of a cross section between A1-A2 in the case where the detection device 100 shown in FIG. 1 is mounted on a display panel 156. As shown in FIG. 12, the detection device 100 can be mounted on the display panel 156 to function as a display device. In other words, the display device is provided with a sensor function. The detection device 100 and the display panel 156 are fixed by an adhesive layer 154 arranged between the detection device 100 and the display panel 156. A self-luminous display panel such as a liquid crystal display panel or an organic EL or an electrophoretic display panel can be used as the display panel 156. The same adhesive layer as that used for fixing the cover substrate 114 described above can be used as the adhesive layer 154. The adhesive layer 154 may have an air gap (not shown) in the same layer by being arranged only in the picture frame area 113, for example.

In the detection device 100, the detection electrode 104 is arranged on the first surface of the sensor substrate 102 and the shield layer 128 is arranged on the second surface of the sensor substrate 102, and a distance between the detection electrode 104 and the shield layer 128 is appropriately maintained and has a simple configuration. Further, the first FPC board 108 attached to the first surface of the sensor substrate 102 and the second FPC board 110 attached to the second surface of the sensor substrate 102 are arranged side by side along one side of the sensor substrate 102, and the electrical connection of each FPC board is easily and precisely controlled. In addition, such arrangements of the first FPC board 108 and the second FPC board 110 facilitate alignment of the first FPC board 108 and the second FPC board 110 with respect to the sensor substrate 102 and alignment with each other. Further, such arrangements strengthen the adhesion (crimping) contact of the first FPC board 108 and the second FPC board 110 to the sensor substrate 102.

Further, according to the present embodiment, the detection sensitivity can be improved by arranging the shield layer 128 in the detection device 100. Cost reduction can be achieved by arranging the shield layer 128 on a back surface of the sensor substrate 102 on which the detection electrode 104 is arranged. Reliability can be improved by connecting the shield layer 128 to the first FPC board 108 using the second FPC board 110.

Second Embodiment

In the present embodiment, a configuration of a display device 200 according to an embodiment of the present invention will be described. Descriptions of the same or similar configurations as those of the first embodiment may be omitted.

1. Overall Configuration

One of the differences between the display device 200 and the detection device 100 of the first embodiment is that a detection device 201 is arranged on a display panel 256. Further, one of the differences between the display device 200 and the detection device 100 of the first embodiment is the position of a shield layer 228. Specifically, in the detection device 100 of the first embodiment, the shield layer 128 is arranged on the second surface of the sensor substrate 102, while in the display device 200, the shield layer 228 is arranged between the detection device 201 and the display panel 256 or the shield layer 228 is arranged in the display panel 256.

Figure 13:
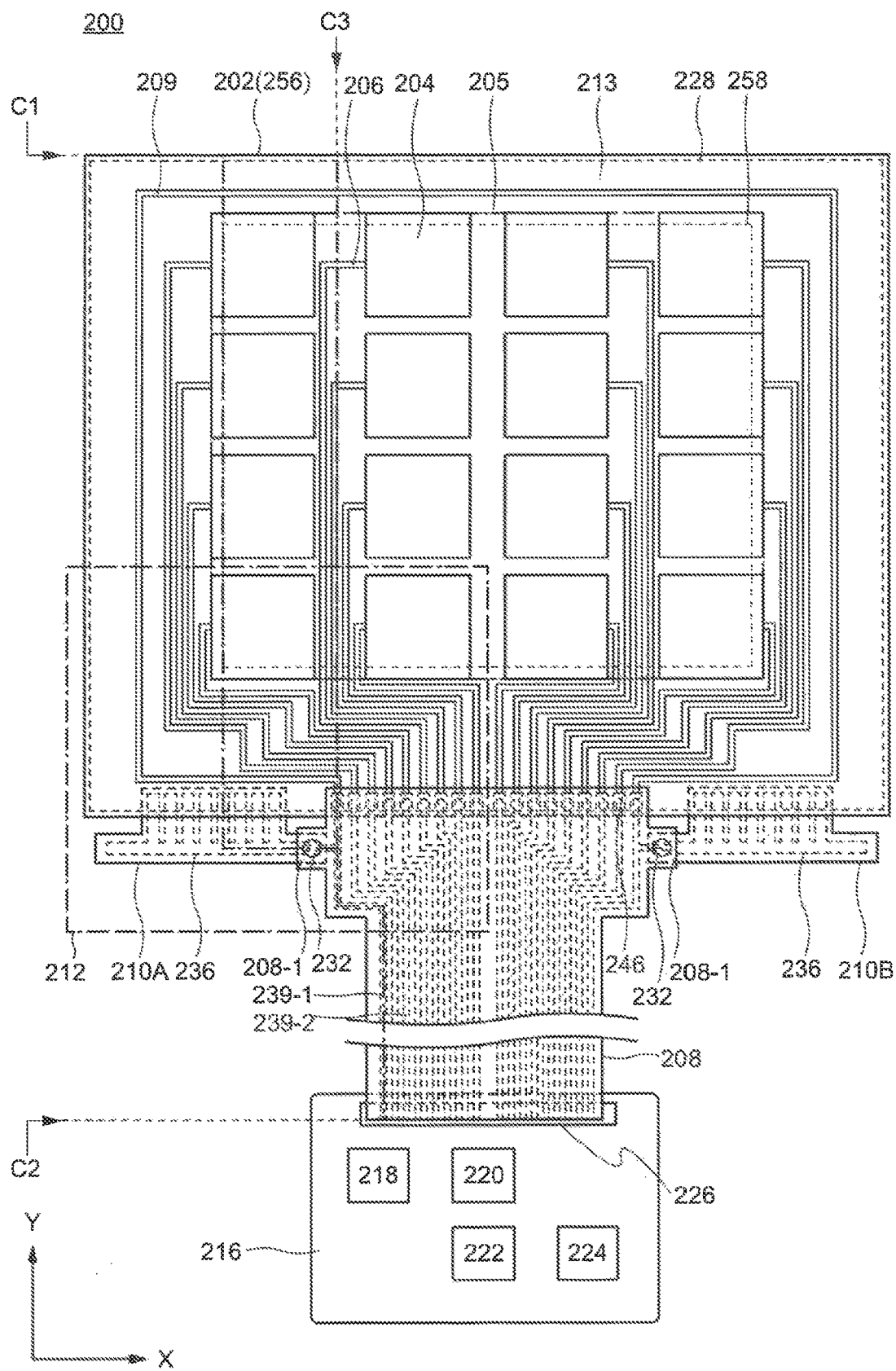
FIG. 13 is a schematic top view of a detection device according to an embodiment of the present invention.

In FIG. 13, a display area 258 of the display panel 256 (refer to FIG. 14A and FIG. 14B) is shown by a dotted line. The display area 258 may be included in a sensor area 205, which is an area surrounding a plurality of detection electrodes 204 of the detection device 201. The display area 258 is arranged so that the plurality of detection electrodes 204 overlaps. The display area 258 is arranged so as to overlap the shield layer 228. The display area 258 may be arranged towards the center of the sensor substrate 202 from the frame area 213 of the sensor substrate 202. The shield layer 228 (refer to FIG. 14A and FIG. 14B) is arranged at a position facing at least the entire surface of the display area 258. The outer edge of the shield layer 228 is arranged at a position facing the frame area 213 or at a position coinciding with the edge of the sensor substrate 202.

2. Peripheral Structure 2-1. Cross-Sectional Structure 1

Figure 14A:
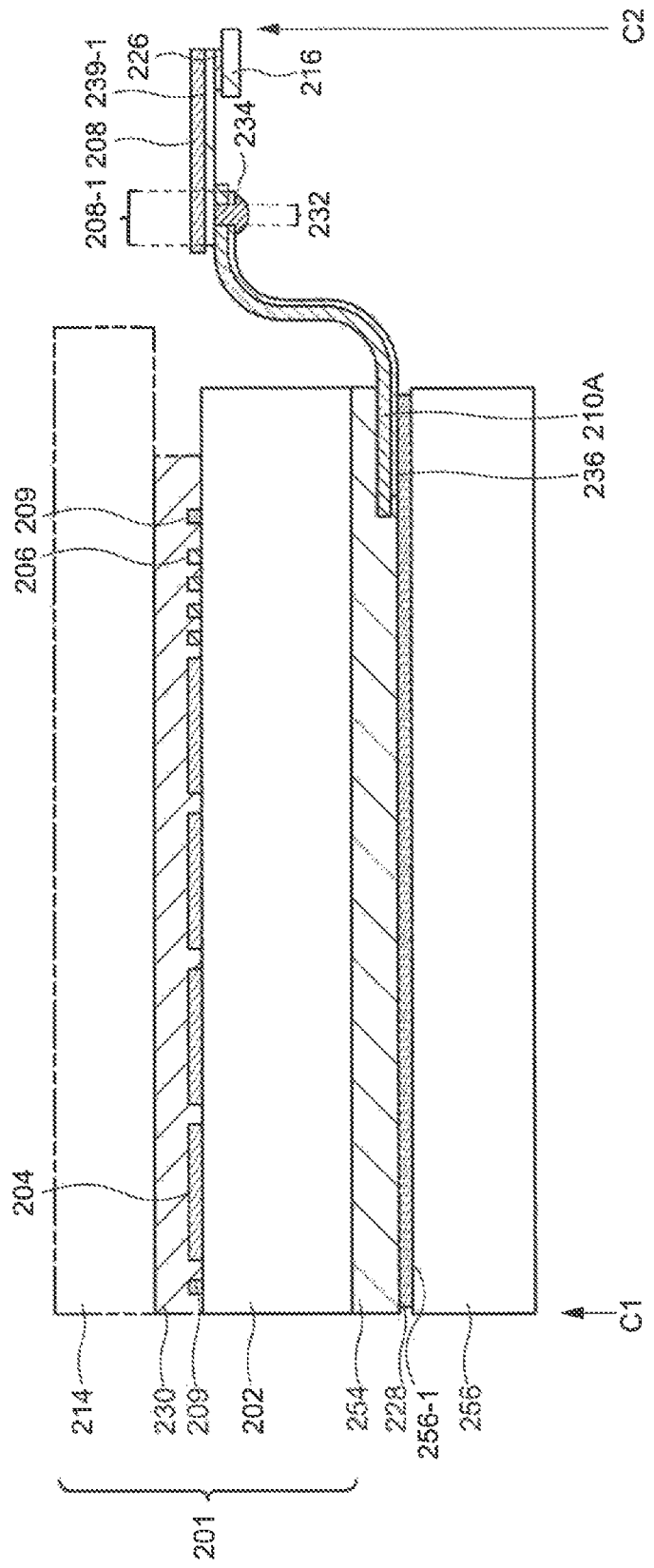
FIG. 14A is a schematic cross-sectional view of a detection device according to an embodiment of the present invention.
Figure 14B:
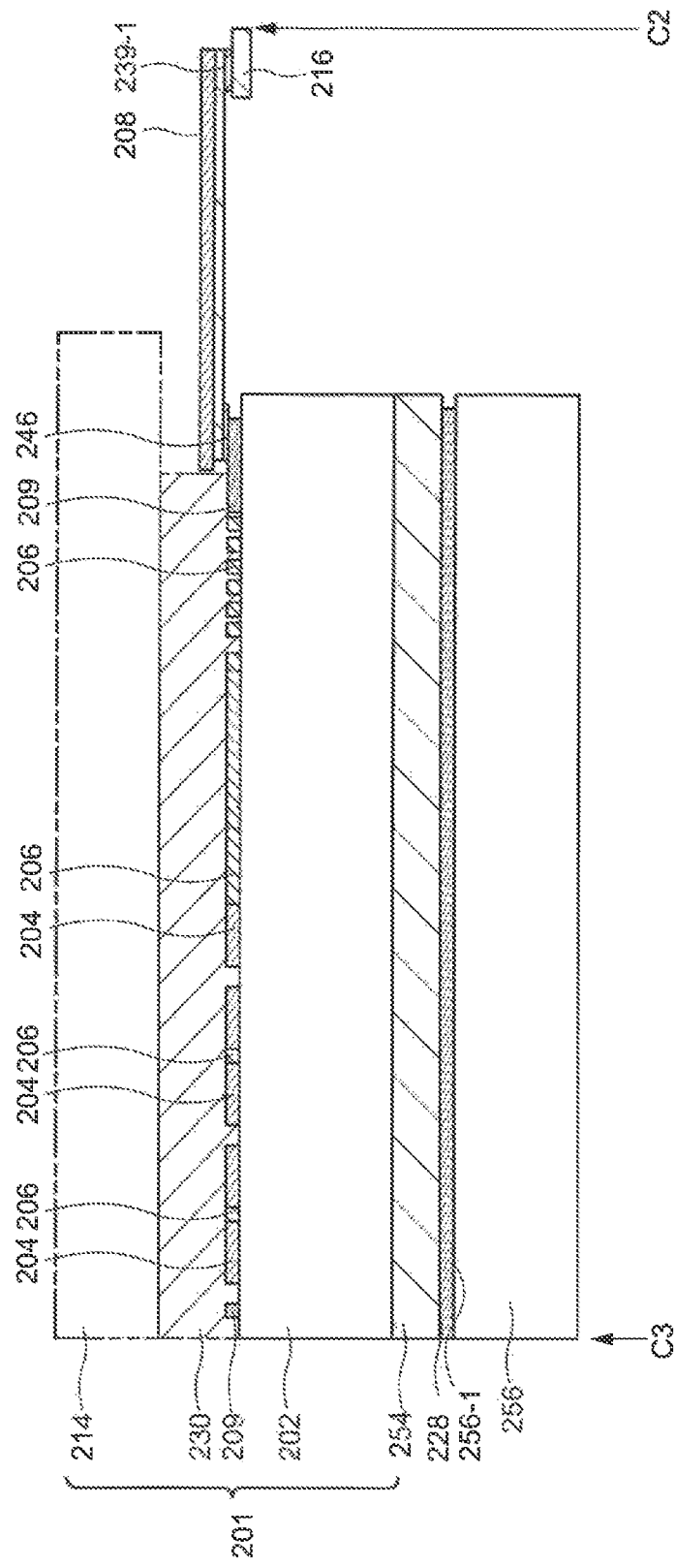
FIG. 14B is a schematic cross-sectional view of a detection device according to an embodiment of the present invention.

FIG. 14A is a schematic view of a cross section between C1-C2 shown in FIG. 13. FIG. 14B is a schematic view of a cross section between C3-C2 shown in FIG. 13.

As shown in the FIG. 14A and FIG. 14B, the display panel 256 has a display surface 256-1 and a back surface opposite to the display surface. The display surface of the display panel 256 is arranged facing the detection electrode 204 of the detection device 201. In addition, the shield layer 228 is arranged between the display surface of the display panel 256 and the detection electrode 204. According to this arrangement, the display panel 256 and the detection device 201 are fixed by an adhesive layer 254 arranged therebetween. The shield layer 228 is arranged on the display panel 256, and the adhesive layer 254 is arranged between the shield layer 228 and the detection device 201. Also in such a configuration, a distance between the shield layer 228 and the detection electrode 204 may be 0.2 mm or more and 10 mm or less, more preferably 0.25 mm or more and 10 mm or less, and even more preferably 0.3 mm or more and 10 mm or less.

The shield layer 228 is arranged on the display panel 256, and a second FPC board 210A is arranged on the shield layer 228. A terminal 236 arranged on the second FPC 210A is directly or electrically connected to the shield layer 228. The second FPC board 210A is arranged between the shield layer 228 and the sensor substrate 202. As shown in FIG. 14A, the shield layer 228 can be electrically connected to the terminal 236 of the first FPC board 208 via a wiring 239-1 by filling a through hole 232 included in the second FPC board 210A with a conductive material 234. As a result, the first surface of the second FPC board 210 may be electrically connected to the shield layer 228, and the second surface of the shield layer 228 may be electrically connected to the first FPC board 208.

In the case where the shield layer 228 has a stacked layer structure described above and one of the layers is the metal layer described above, or in the case where the shield layer 228 has only the metal layer without the stacked layer structure, the shield layer 228 of the metal layer is arranged on a counter substrate 264, so that a protective film (not shown) may be arranged between the shield layer 228 of the metal layer and the counter substrate 264. The protective film has a single-layer structure or a stacked layer structure and is formed of a film containing a resin such as a silicon-containing inorganic compound, an epoxy-resin, an acryl-resin, or a silicone-resin.

In the case where the display panel 256 is a liquid crystal display panel, as shown in FIG. 15, the display panel 256 has a third FPC board 259 electrically connected to a display control circuit 261. A signal for driving the display panel 256 is transmitted from the display control circuit 261 to the display panel 256 via the third FPC board 259. In this case, since the shield layer 228 is arranged between the detection device 201 and the display panel 256, it is possible to block noise from the display panel 256.

In addition, in the case where the display panel 256 is a liquid crystal display panel, the display device has a polarizing plate 260 between the shield layer 228 and the adhesive layer 254. Therefore, the display device has the polarizing plate 260 between the sensor substrate 202 and the shield layer 228. Further, the display panel 256 includes a TFT substrate 262 including a transistor, the counter substrate 264 including a color filter, a liquid crystal layer (not shown) arranged between these substrates, and the polarizing plate 260 arranged facing the counter substrate 264. In this case, the TFT substrate 262 and the counter substrate 264 are arranged to face each other, and the shield layer 228 is arranged between the polarizing plate 260 and the counter substrate 264. The shield layer 228 is formed on the upper surface of the counter substrate 264. Further, the shield layer 228 may be formed in direct contact with the counter substrate 264. Without being limited to this configuration, one or a plurality of other layers may be interposed between the counter substrate 264 and the shield layer 228. Also, in the liquid crystal display panel, a configuration in which a color filter is arranged on a side of the TFT substrate can be adopted.

In this case, as shown in FIG. 15, the display control circuit 261 can be electrically connected to the detection circuit board 216. For example, the display control circuit 261 may be electrically connected to the detection circuit board 216, which is electrically connected to the sensor control circuit described above, via a connection means such as a fourth FPC board 263. In the driving method of the display device 200, which will be described later, a driving method that separates a period (refresh period) in which the display data is written to each pixel and a detection period of the sensor can be used.

Further, as described above, the display panel 256 may be a liquid crystal display panel or an organic electroluminescence display panel. In particular, in the case where the liquid crystal display panel is used for the display panel and a liquid crystal of an IPS system such as the FFS method in which a common electrode is not arranged on a side of the counter substrate is used, the shield layer 228 can function as an antistatic layer.

3. Driving Method

Next, an example of a driving method of the display device including the display panel 256 will be described.

Figure 16:
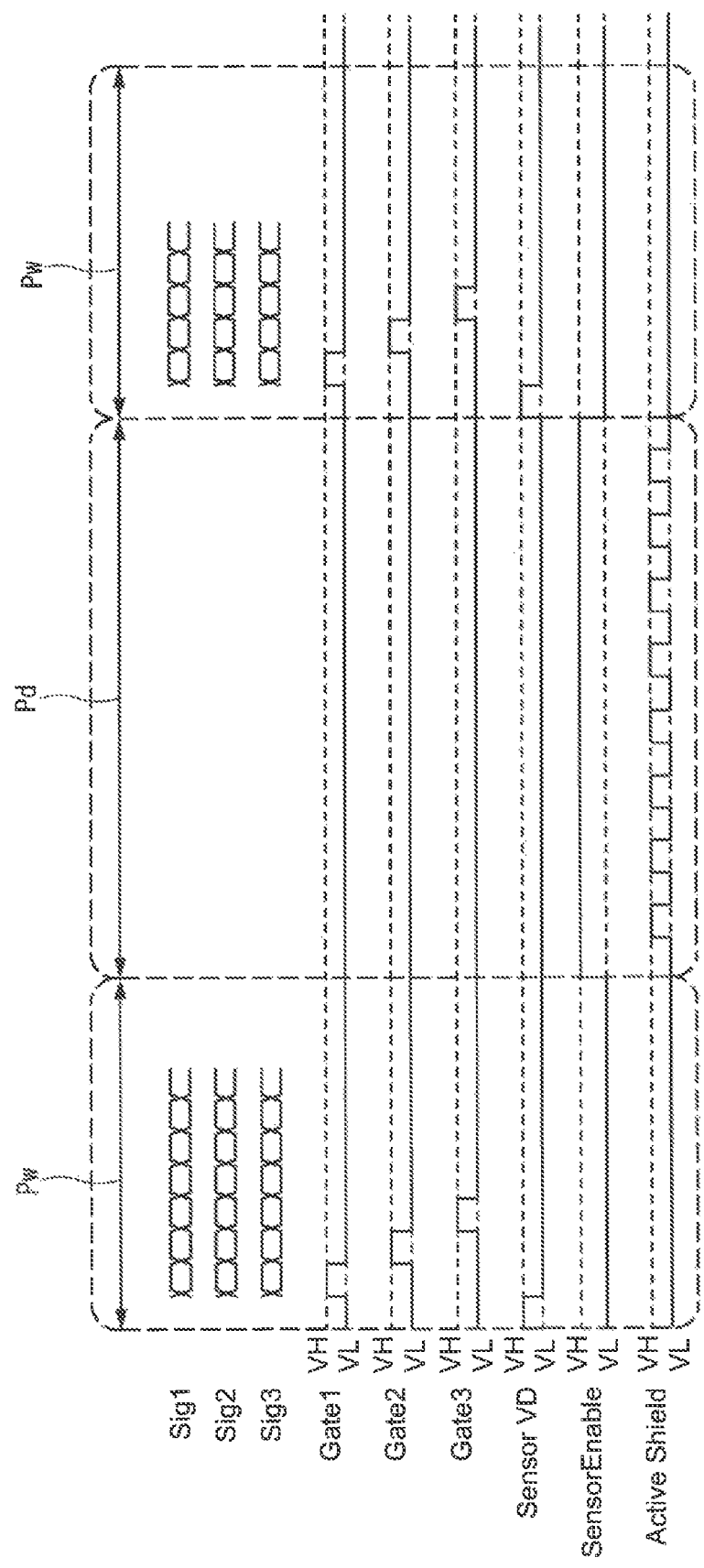
FIG. 16 is a timing chart showing an example operation of a display device according to an embodiment of the present invention.

FIG. 16 is a timing chart showing a driving method of the display device 200. As shown in FIG. 16, a display writing period Pw and a detection period Pd are alternately executed and are executed in different periods. A signal executing a display operation is supplied to the display panel 256 during the display writing period Pw. At this time, the detection electrode 204 and the shield layer 228 are maintained at a constant potential. Signals (hereinafter referred to as detection signals) such as a detection operation or position detection operation are supplied to the detection device 201 during the detection duration Pd. At this time, display writing on the display panel 256 stops. Further, a signal in phase with the detection signal or the same signal as the detection signal is supplied to the shield layer 228 during the detection period Pd. That is, the signal applied to the detection device 201, especially the detection electrode 204, and the signal applied to the shield layer 228 during the detection period Pd are synchronized.

More specifically, first, the display data is written during the display writing period Pw. The display control circuit 261 of the display panel 256 supplies a pixel signal to each pixel of the display panel 256 corresponding to gate lines Gate 1, Gate 2, and Gate 3 via signal lines Sig 1, Sig 2, and Sig 3. Drivers of the display panel 256 supplies a drive signal for executing a switch operation of each pixel to the gate lines Gate 1, Gate 2, and Gate 3 during a display writing period Pw1. In addition, the driver of the display panel 256 outputs Sensor VD and Sensor Enable to the detector of the detector device 201. The detection device 201 receives the timings of Sensor VD and Sensor Enable, and executes the detection operation during the detection duration Pd. As described above, the signal supplied to the shield layer 228 is synchronized with the signal supplied to the detection device 201 during the detection period Pd. In this way, a configuration in which the potential supplied to the shield layer 228 is changed in a predetermined period rather than a fixed potential and the potential of the shield layer 228 is changed is referred to as an Active shield (the active shield described above). Also, a configuration in which a fixed potential is applied to the shield layer without adopting the Active shield method can be adopted.

As shown in FIG. 16, in the driving method of the display device 200, the display writing period Pw of the display panel 256 and the detection period Pd of the detection device 201 are different, and the signal supplied to the shield layer 228 during the detection period Pd of the detection device 201 is synchronized with the drive signal of the detection device 201. The detection period Pd between the preceding and succeeding display writing period Pw is a so-called blanking period in the display device 200. All the pixel switches of the pixels of the display panel 256 are turned off, and the displays of the pixels are not moved. As described above, in the driving of the display device 200, since the display writing period (refresh period) and the detection period are separated from each other, the electric field generated by the driving of the shield layer 228 has little effect on the display of the display panel 256. Further, in the display device 200, an effect on the detection device 201 due to the driving of the display device 200 is small because the display panel 256 and the detection device 201 are separated by the adhesive layer 254 and the shield layer 228 located therebetween. Therefore, applying the present embodiment can provide the display device 200 with high detection sensitivity and accuracy of the detection device 201, less disturbance in displaying the display panel 256, and higher reliability is provided.

In the display device 200, the adhesive layer 254 is included between the display panel 256 and the detection device 201, the shield layer 228 is located between the adhesive layer 254 and the display panel 256, the distance between the display panel 256 and the detection device 201 increases, and the detection sensitivity and accuracy of the detection device 201 increase. Further, arranging the shield layer 228 on the counter substrate 264 also functions as an antistatic layer. Therefore, applying the present embodiment can make the detection sensitivity and accuracy of the detection device 201 high, reduce the manufacturing processes of the display device 200, and provide the display device 200 that is inexpensive and highly reliable.

What is claimed is:
1. A detection device comprising:
a substrate;
a detection electrode on a first surface of the substrate;
a first flexible printed circuit board electrically connected to the detection electrode;
a shield layer on a second surface opposite the first surface of the substrate; and
at least one second flexible printed circuit board electrically connected to the shield layer on the second surface,
wherein
the first flexible printed circuit board has a first terminal on a side of a first side extending outward from the substrate,
the second flexible printed circuit board has a second terminal on a side of a second side extending outward from the substrate,
the first flexible printed circuit board and the second flexible printed circuit board are arranged side-by-side along a side of the substrate so that at least a portion of the first terminal and the second terminal overlap in a plan view, and
the first and second terminals are electrically connected.
2. The detection device according to claim 1,
wherein
the at least one second flexible printed circuit board comprises two second flexible printed circuit boards,
the two second flexible printed circuit boards are electrically connected to the shield layer on the second surface and to the first flexible printed circuit board.
3. The detection device according to claim 1,
wherein
the first flexible printed circuit board has a third terminal,
the second terminal has a slit structure,
a width of a slit of the second terminal is wider than a width of the third terminal,
the first flexible printed circuit board is electrically connected to the detection electrode via the third terminal, and
the second flexible printed circuit board is electrically connected to the shield layer via the second terminal.
4. The detection device according to claim 1,
wherein
the second terminal has a through-hole,
the second terminal has conductors on both of a first side and a second side of the second flexible printed circuit board, and
the first terminal and the second terminal are electrically connected by a conductive material filled in the through-hole.
5. The detection device according to claim 1, wherein the shield layer has a transparent conductive layer.
6. The detection device according to claim 1, wherein the shield layer has a metal layer.
7. The detection device according to claim 6,
wherein the shield layer further comprises a transparent conductive layer,
the metal layer has an opening,
the detection electrode is arranged within an area of the opening in plan view,
the transparent conductive layer overlaps the detection electrode and the metal layer, and
the area of the opening of the metal layer is located inside a peripheral edge of the transparent conductive layer.

8. The detection device according to claim 6, wherein
the metal layer has an opening,
the detection electrode is arranged within an area of the opening in plan view, and
the metal layer has an auxiliary wiring extending from one side of the opening to the other side of the opening.

9. A display device comprising:
a display panel,
the detection device according to claim 1, and
an adhesive layer located between the display panel and the detection device.

10. A display device comprising:
a display panel,
a detection device on the display panel, and
an adhesive layer located between the display panel and the detection device,
wherein
the detection device has a shield layer, the shield layer has a metal layer with an opening and a transparent conductive layer,
an area of the opening is wider than a display area of the display panel,
the transparent conductive layer covers the display area and the metal layer,
the area of the opening of the metal layer is located inside a peripheral edge of the transparent conductive layer,
the metal layer has an auxiliary wiring crossing or traversing the display area of the display panel,
the auxiliary wiring passes between adjacent pixels of a plurality of pixels arranged in the display panel,
the detection device is electrically connected to a first flexible printed circuit board,
the shield layer is electrically connected to a second flexible printed circuit board, and
the first flexible printed circuit board and the second flexible printed circuit board are electrically connected.

11. The display device according to claim 10, wherein
a detection electrode is provided within the area of the opening in plan view.

\* \* \* \* \*